United States Patent [19]

Oliver et al.

[11] 4,414,589

[45] Nov. 8, 1983

[54] EMBEDDED SERVO TRACK FOLLOWING SYSTEM AND METHOD FOR WRITING SERVO TRACKS

[75] Inventors: Theodore A. Oliver, Ann Arbor; David L. Nelson, Milford; Keat-Lye Chan, Ypsilanti, all of Mich.

[73] Assignee: Northern Telecom Inc., Nashville, Tenn.

[21] Appl. No.: 330,855

[22] Filed: Dec. 14, 1981

[51] Int. Cl.³ .................. G11B 5/55; G11B 5/58; G11B 23/36; G11B 27/36
[52] U.S. Cl. .................................. 360/77; 360/31; 360/78; 360/135
[58] Field of Search .............. 360/31, 135, 69, 70, 360/71, 72.1, 73, 74.1, 74.4, 75, 77, 78

[56] References Cited

U.S. PATENT DOCUMENTS

| | | | |
|---|---|---|---|
| 3,404,392 | 10/1968 | Sordello | 340/174.1 |
| 3,614,756 | 10/1971 | McIntosh | 340/174.1 |
| 3,812,533 | 5/1974 | Kimura et al. | 360/77 |
| 3,821,804 | 6/1974 | Stevenson et al. | 360/77 |
| 3,840,893 | 10/1974 | Jacoby et al. | 360/77 |
| 3,864,740 | 2/1975 | Sordello et al. | 360/77 |
| 3,919,697 | 11/1975 | Walker | 340/173 R |
| 3,924,268 | 12/1975 | McIntosh et al. | 360/78 |
| 3,947,881 | 3/1976 | Dahill et al. | |
| 3,953,889 | 4/1976 | Scieszinski et al. | 360/77 |
| 3,956,769 | 5/1976 | Beecroft et al. | 360/77 |
| 3,959,820 | 5/1976 | Braun | 360/77 |
| 3,994,016 | 11/1976 | Moghadam | 360/77 |
| 4,007,493 | 2/1977 | Behr et al. | 360/77 |
| 4,016,603 | 4/1977 | Ottesen | 360/135 |
| 4,027,338 | 5/1977 | Kril | 360/77 |
| 4,030,130 | 6/1977 | Smith | 360/77 |
| 4,044,388 | 8/1977 | Metzger | 360/70 |
| 4,048,660 | 9/1977 | Dennison et al. | 360/77 |
| 4,052,741 | 10/1977 | Baca et al. | 360/77 |
| 4,068,268 | 1/1978 | Idemoto et al. | 360/78 |
| 4,072,990 | 2/1978 | Case et al. | 360/77 |
| 4,087,842 | 5/1978 | Manly | 360/77 |
| 4,087,843 | 5/1978 | Louis et al. | 360/77 |
| 4,151,571 | 4/1979 | Cardot et al. | 360/77 |
| 4,163,265 | 7/1979 | van Herk et al. | 360/77 |
| 4,238,809 | 12/1980 | Fujiki et al. | 360/131 |

OTHER PUBLICATIONS

Disclosure Bulletin, R. D. Commander SERVO POSITIONING OF MAGNETIC HEAD, vol. 13, No. 10, Mar. 1971, p. 3161.
IBM Technical Disclosure Bulletin, A. J. Betts, NULL SERVO PATTERN, vol. 18, No. 8, Jan. 1976; pp. 2656-2657.

Primary Examiner—George G. Stellar
Attorney, Agent, or Firm—Price, Heneveld, Huizenga & Cooper

[57] ABSTRACT

A servo track following system for positioning a moving read/write head relative to a magnetic storage disc. A plurality of servo tracks are recorded in sectors on the disc for identifying radial positions or informational tracks. The servo tracks have a nonuniform radial track density varying from more dense at the periphery of the disc to less dense at the interior, established with a method that allows the unique performance characteristics of the head to determine the actual spacing of the tracks. A clock track is written by writing a single pulse on a fixed clock track head, phase-lock looping to an intermediate clock track, which is written on a moving head, and then phase-lock looping up to the final clock track which is written on the fixed clock track head. Radial track density is then determined by moving a head to a limit stop and writing a reference track. Thereafter, the head is displaced an amount sufficient to reduce the amplitude of the reference track by a predetermined percentage which is related to the ultimate average track density. Thereafter, another reference track is written and the head is again stepped away from the second reference track an amount sufficient to again reduce the amplitude of the reference track by a predetermined percentage. This is continued until the disc is filled with reference tracks. If the average track density thus achieved is unsatisfactory, the reduction number is adjusted and the process is repeated. Once the correct reduction number is determined for a predetermined average track density, the servo tracks are written by alternatively writing servo and reference in alternating servo and informational sectors. The reduction number is used to determine the pitch of all tracks.

71 Claims, 15 Drawing Figures

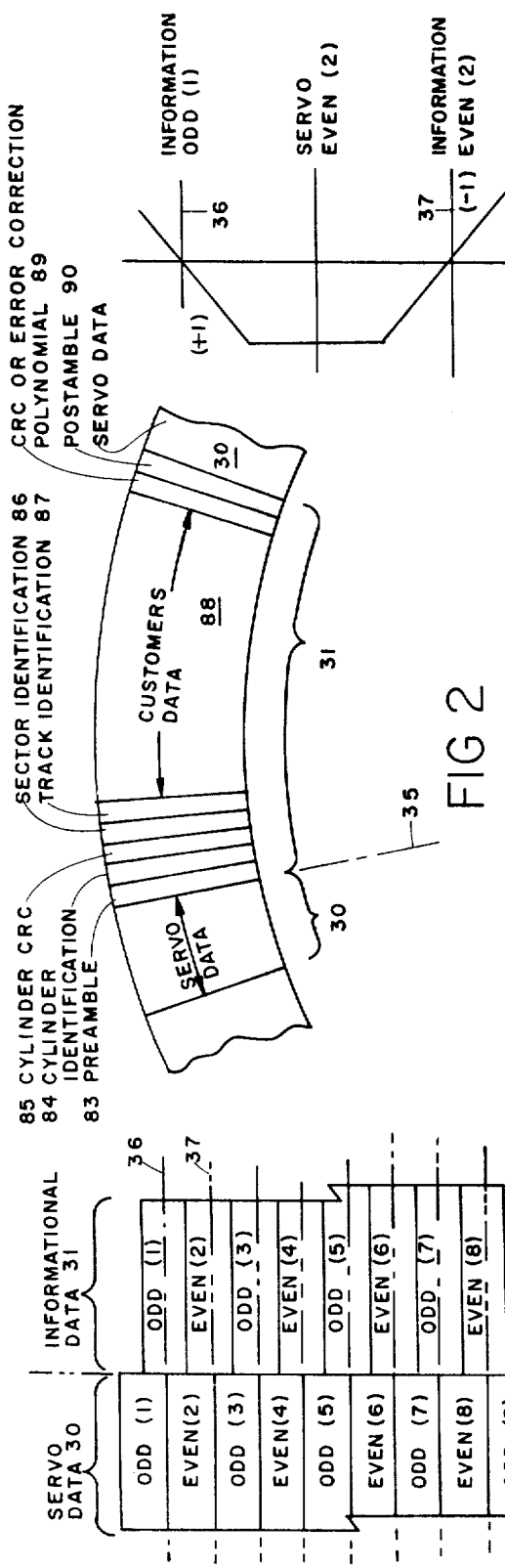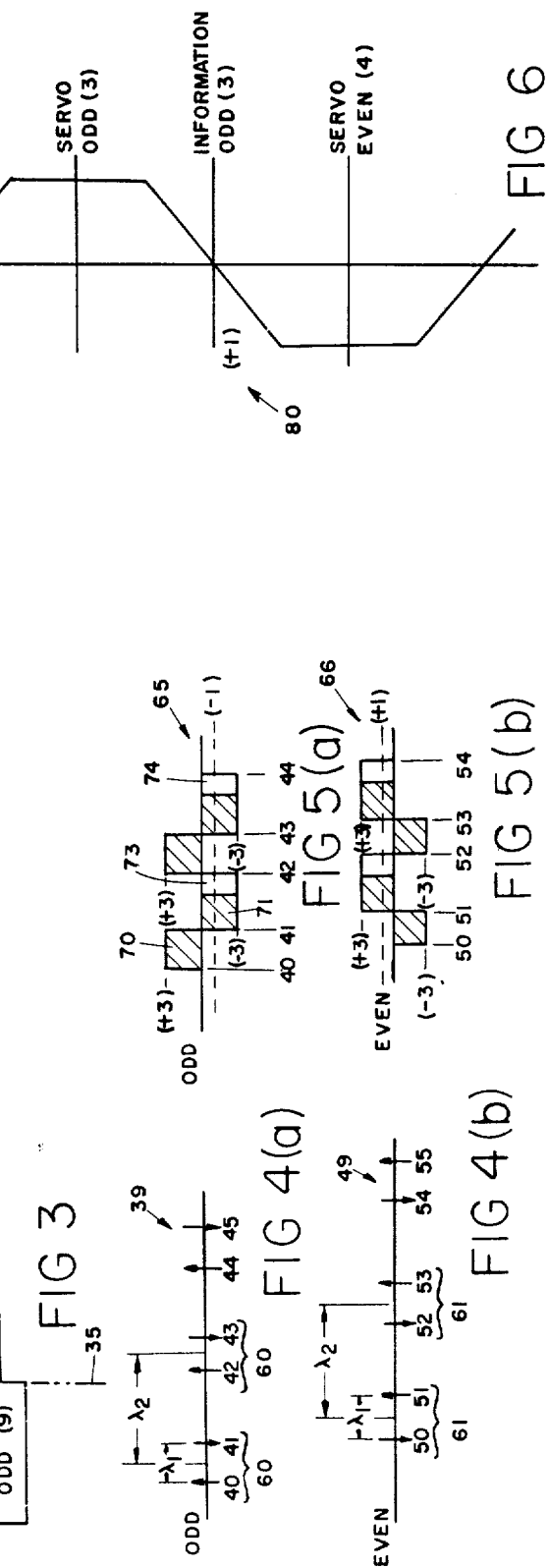

(k) 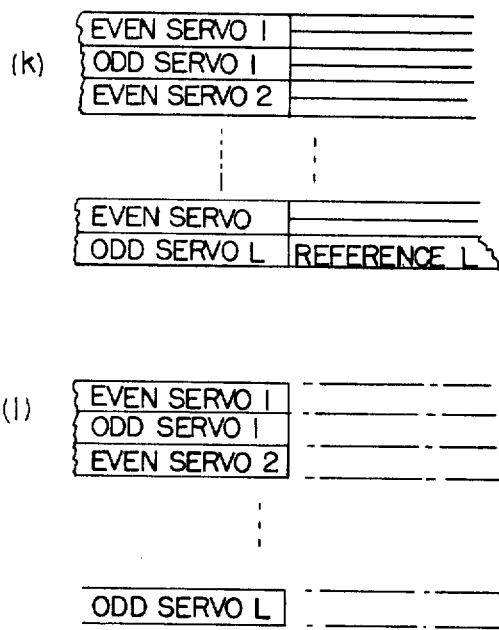 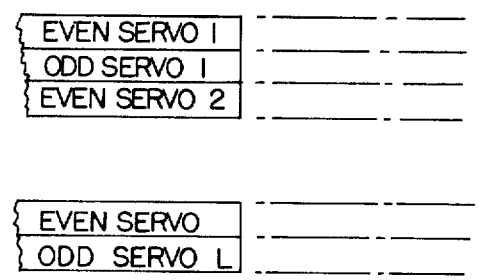
(l) 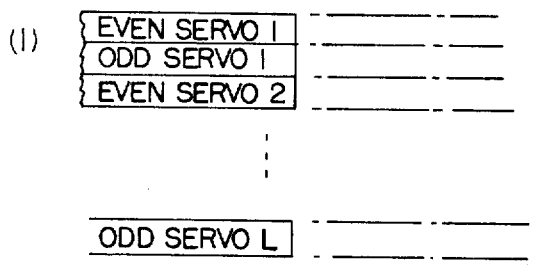 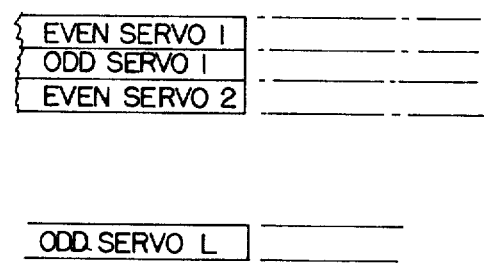

EMBEDDED SERVO TRACK FOLLOWING SYSTEM AND METHOD FOR WRITING SERVO TRACKS

BACKGROUND OF THE INVENTION

The invention relates generally to the definition of a number of data tracks on a recording medium. In particular, the invention relates to the definition of a plurality of concentric data tracks on a magnetic disc, the accessing of these data tracks through the use of an embedded servo control system and a technique for writing servo data.

Record discs are commonly used for storing data in computers and other data processing systems. Such record discs are provided on both faces with a layer of magnetizable material for recording data in the formm of a plurality of concentric tracks. Some disc systems or disc files as they are frequently called, include a plurality of such record discs stacked on a common spindle and driven by a common drive whereas others include only one record disc. The discs are rotated at a constant speed and transducers or heads capable of either reading or writing data on the discs are flown over the disc surfaces on an air film. Although there are a large number of tracks on each disc surface, generally only one or two read/write heads are provided for each disc surface. Thus, the transducers or heads must be translatable across the surface of the discs and must include means for very accurately positioning or aligning the heads with a preselected data track. Addressing data stored on the disc is accomplished by means for selecting a read/write head, specifying the track position and specifying the segment or sector of the track to be accessed. The velocity and position of a read/write head positioner is controlled by a servo control circuit. The read/write head positioner is controlled by a servo control circuit. The read/write heads associated with each surface of each disc are generally positioned in unison by a single positioner. Once properly positioned to the addressed track, data transferred to or from the track is affected upon selecting the head associated with the specific disc surface bearing the track to be accessed.

The art of digital recording on a magnetic disc has advanced to the point where data is being recorded in ever increasing densities on the magnetic disc surfaces. There are a number of approaches which have been taken in compacting the data on a magnetic disc. One approach has been to devise novel digital coding techniques which increase the information content in each magnetic recording on the disc. Another approach has been to increase the number of concentric data tracks on a disc surface to the point where the tracks are very densely packed. This latter approach has led to the development of increasingly sophisticated servo systems that are capable of successively positioning a transducer or head in closely spaced increments over a magnetic disc. The very earliest track following servo systems actually did not follow the data tracks. In these earliest systems, position signals were derived from position transducers which were independent from the read/write heads. In some cases, an optical pickup was used to generate a position signal as an arm carrying the read/write heads radially traversed the disc. As track densities increased, optical systems were not accurate enough and magnetic transducers which traversed a dedicated servo surface were used. In some cases optical systems were used to coarsely position the heads and the magnetic transducer was used to finely position the heads. In systems employing a dedicated servo surface position information was magnetically recorded on a dedicated servo surface and read by a magnetic recording head which was separate from the read/write heads and was generally referred to as a servo head. As positioning systems further progressed, various schemes for putting the data on the dedicated servo surface were used to increase track densities. All of these earlier positioning systems are referred to as continuous data track following systems since position information is always continuously available from the dedicated servo head. However, these prior art continuous data track following systems were far from optimum track following systems since these systems did not actually follow the data track that they were intended to read. As the distance between data tracks became closer and closer, variations in the relative positions of the separate read/write heads and servo heads become much more significant. Eventually changes in the relative position of these transducers due to thermal effects or other purely mechanical problems became the factors limiting track densities in prior art continuous data track following systems.

Other continuous data track following servo systems have employed a special recording medium having overlapping magnetizable layers with different coercivities.

A natural breaking point in the development of disc track following systems ocurred with the development of sample data track following systems. Sample data track following systems attempt to follow the actual data track that is being read with the read/write head. This is generally accomplished by interposing bursts of servo control data between sectors on the recording media containing the informational data which is being read or written. However, many previous sample data systems did not give up the older continuous data type positioning system. In other words, both the older continuous data system and the newer sample data system are used to control the read/write heads. Typically, an optical pickup or a dedicated servo surface and dedicated servo head are used to coarsely adjust the read/write head and a sample data system is employed to finely adjust the read/write head, the servo information for the sample data system coming directly from the track that is being read by the read/write head. Problems with this type of track following system are related to its cost and complexity and the manner in which servo data is coded on the magnetic disc.

As interest increased in embedded servo track following systems, a variety of schemes such as "di bit", "tri bit", "quad bit" and variations thereof developed for recording servo data on a recording medium that is later read by the read/write head, along with the data being read or recorded, to create a position signal. While some of these sample data systems eliminate the dedicated servo surface and dedicated servo head previously necessary for coarse positioning of the read/write head, most of these prior art sample data techniques record servo data with an amplitude sensitive scheme. Amplitude demodulation of servo data presents several problems all related to the fact that in an amplitude modulated system an automatic gain control (AGC) or equivalent circuitry is required. In amplitude modulated systems, the first pulses of the servo data must be used to normalize the signal. In the stream of servo data, the first pulses all appear at the same amplitude since they are recorded in adjacent tracks in the same direction. Sets of these sequential pulses are recorded differently on adjacent servo data tracks and the amplitude of a second set of pulses associated with an adjacent servo track is then compared to the first set of pulses to determine the radial position of the head relative to adjacent servo data tracks. The circuitry necessary for accomplishing these functions is quite different from the circuitry used to read the informational data stream. Thus, a not insubstantial amount of additional circuitry is required to demodulate the position signal. Furthermore, a significant number of pulses are required for the AGC to determine an average pulse and this substantially increases the overhead of the system, or the amount of the recording media on the disc dedicated to the servo data.

The principal exception to amplitude modulated sample data systems involves the use of adjacent servo tracks which generate waveforms of different frequencies. In this case control circuitry is provided to frequency demodulate the signals generated by adjacent servo data tracks, generate a difference signal when the modulated signal and each servo waveform signal are multiplied and then detect the amplitude of each different signal, thereby sensing the relative position of the transducer and the data track. However, these techniques also require substantial circuitry of a different type from the circuitry normally used to read the data stream from the read/write head and require a substantial overhead. In most prior art sample data track following servo systems, at least 15 percent of the disc surface is dedicated to servo data.

Another exception to the amplitude modulated sample data systems and to the previously discussed frequency modulated system is the system disclosed in U.S. patent application Ser. No. 123,501 filed Feb. 22, 1980 entitled EMBEDDED SERVO TRACK FOLLOWING SYSTEM and assigned to the same assignee now abandoned. The system disclosed in this application features a technique for coding embedded servo data that does not require substantial circuitry of a different type from the circuitry normally used to read the data stream coming from the read/write head. Thus, a position signal is generated with substantially the same circuitry used to read and write data on the disc, achieving a substantial savings in cost. In this system, alternately spaced odd and even servo data tracks are provided which generate net positive and net negative DC signals when the read/write head is positioned thereover. The servo data tracks are written at a frequency which is similar to the frequency of data normally read and written with the read/write heads. Two frequencies are written on each of the odd and even servo data tracks, one frequency being impressed upon the other. However, the series of transitions that comprise the odd servo data tracks are provided with a different order or direction from the series of transitions which comprise the even servo data tracks. More specifically, each of the odd and even tracks comprise a series of equally spaced transition pairs, each of the transition pairs comprising first and second equally spaced oppositely directed transitions. Each of the transition pairs disposed in the even track are provided with an identical order and each of the transition pairs disposed in an adjacent odd track are provided with an order identically opposite of the order of the transition pairs disposed in the even track. The transitions of each transition pair are provided with a spacing that is equal but less than the spacing of the transition pairs themselves. Adjacent odd and even servo tracks thus formed, generate waveforms having DC components equal in magnitude but opposite in polarity such that the DC components of the odd and even servo data tracks cancel each other when a read/write head is disposed therebetween. Servo control means is provided for sensing the output of the read/write heads and selectively energizing a positioning means for nulling the output of the read/write head and accurately centering the same on an informational data track that is disposed therebetween.

In the prior art, embedded servo data is usually written with a complex, mechanical/optical technique that involves a sophisticated lead screw actuated mechanical device which is pressed against the existing read/write head positioner for establishing the position of the read/write heads and a laser interferometry technique for precisely determining the position of the heads. Not only is this mechanism expensive, but the method of writing embedded servo with this mechanism is time consuming. Furthermore, in the past no provision has been made for the changing performance characteristics of the read/write heads as they radially traverse the disc. Since the performance of the read/write heads is reduced as the head approaches the interior of the disc, in the prior art a constant track density is chosen which is limited by the performance characteristics of the heads on the interior of the recording surface of the disc.

SUMMARY OF THE INVENTION

These and other problems in the prior art are solved by provision of an embedded servo track following system that features embedded servo data having a nonuniform radial track density. A method for writing the embedded servo data is also provided which enables the unique performance characteristics of the read/write heads to determine the best radial track density. The servo system comprises positioning means energizable for moving the read/write head to preselected radial recording positions on the disc. A drive means provides for relative movement between the disc and the read/write head thereby enabling the transfer of data between the disc and the head. The disc is divided into informational data sectors and servo data sectors. The servo data sectors are provided with a plurality of closely spaced servo tracks recorded on the disc for identifying preselected radial recording positions on the disc. The servo tracks are provided with a nonuniform radial track density which varies substantially continuously from track to track according to the performance of the read/write transducer, common to the servo tracks from generally more dense at the periphery of the disc where transducer performane is high to generally less dense at the interior of the disc where head performance is low. A servo control means is provided for sensing the output of the read/write head as it passes over the servo data sectors and selectively energizing the positioning means for positioning the read/write head at preselected radial recording positions on the disc.

The method for writing servo data requires a clock track for providing an index of disc position and a measure of disc speed. After selecting a predetermined number of transition pairs N for a clock track, a single pair of transitions is written with a fixed clock track head.

The single pair of transitions is read to create an initial electrical pulse. The initial electrical pulse is phaselock looped to a number of pulses approximately equal to the square root of N. An intermediate clock track is then written having a number of transition pairs equal to the square root of N with one of the moving read/write heads. Thereafter, the intermediate clock track is read and the output is phase-lock looped to N electrical pulses which are written with the fixed read/write head to provide a permanent clock track having N transition pairs.

The optimum track spacing is determined by positioning one of the moving read/write heads at a first limit stop in the range of travel of the positioning means. A first reference track is then written with the moving head. A predetermined reduction number or percentage of amplitude reduction X%, is then chosen that is empirically related to the desired average track density. The first reference track is then read with the moving head. The moving head is then displaced away from the first limit stop until the amplitude of the first reference track is reduced to X% of its original amplitude. A second reference track is then written with the moving head and the moving head is then displaced again in the same direction until the amplitude of the second reference track is reduced to X% of its original value. The process is continued, writing successive reference tracks and displacing the moving head by an amount sufficient to reduce the amplitude to X% of its original value, until the disc is filled with reference tracks. The number of reference tracks so written is counted and the process is stopped when a second limit stop in the range of travel of the means for positioning is encountered. Knowing the number of tracks written and the length of travel of the moving head, the average track density is checked to insure that it is within a predetermined range of the desired average track density. If the average track density is high, the disc is erased, the X% value is lowered and the process is repeated. If the average track density is low, the disc is erased, the X% value is increased and the process is repeated. If the average track density is within the predetermined range of the desired average track density, the desired reduction rate X%, for a given average track density, has been determined and the servo writer may then proceed to the servo writing steps.

Embedded servo data is written on the disc by positioning a first moving read/write head at a first limit stop in the range of travel of the positioning means. The magnetic storage disc is then divided into servo data sectors and reference data sectors. The reference data sectors will later correspond to informational data sectors within which customer data will be read and written. A servo data track is then written with the moving head in the servo data sectors on the storage disc. A first reference track is then written with the moving head in the reference data sectors on the storage disc. Then, using the predetermined reduction rate, X%, the first reference track is read with the moving head and the moving head is displaced away from the first reference track until the amplitude of the first reference track is reduced to X% of its original value. A second reference track is then written with the moving head in the reference data sectors. The moving head is then displaced again in the same direction until the amplitude of the second reference track is reduced to X% of its original amplitude. A second servo track is then written in the reference data sectors of the magnetic storage disc. The steps of alternately writing two reference tracks and one servo track is continued until the servo data sectors and reference data sectors of the disc are filled and the moving head hits a second limit stop. A measure of the number of servo data tracks written is kept and if the servo data track density is high, the disc is erased, the reduction rate X% is lowered, and the servo writing steps are repeated. If the servo track density is low, the disc is erased, the reduction rate X% is raised, and the servo writing steps are repeated. If the servo track density is within a predetermined range of the desired average servo track density, the servo writing steps are completed with the exception that the reference tracks written in the informational data sectors on the disc must be erased so that informational data or customer data may be read and written in these sectors of the disc. The informational data tracks thereafter contained on these sectors of the disc are defined by the servo data written in the servo data sectors on the disc. If a plurality of discs and a plurality of moving read/write heads are provided, embedded servo data is written on all of the recording surfaces by writing servo data with the additional moving read/write heads at the same positions at which servo data is written on the moving read/write head associated with the surface upon which reference is also being written in the reference data sectors of the disc. Thus, only one surface of one disc and one head is used to write reference for the determination of pitch. However, once pitch is determined with this head and this reference surface, servo data is written on all surfaces traversed by identical moving read/write heads that are similarly mounted on the positioning means.

The distance between adjacent reference tracks is approximately half of a data track. With current head technology and an average track density similar to that written with prior servo data writing techniques an initial reduction rate in the range of 25% to 50% is used. Typically an initial reduction rate of 40% is used. Larger average track densities may be achieved with the same head technology by writing servo data according to the method of the present invention. Track density is increased by raising the reduction rate until the signal to noise ratio becomes objectionable. In the past, average track densities have been limited by head performance on the interior of the disc. The servo writing technique of the present invention may be used to take advantage of higher head performance at the periphery of the disc to increase the total number of tracks contained on a given disc. When servo data is written according to the present invention, the pitch or track density is not constant, but rather varies from the exterior to the interior of the disc according to head performance. Local pitch or track density varies from more dense at the periphery of the disc where head performance is high to less dense at the interior of the disc where head performance is low. In addition to providing an overall increase in system performance, the servo writing technique of the present invention eleminates the relatively expensive mechanical/optical equipment previously used to write embedded servo data. According to the present invention, embedded servo data is written directly on the discs with much of the same equipment which is later used to read and write data on the informational data sectors of the discs. Furthermore, the technique may be executed in an almost entirely automated process which is relatively fast and requires little manual labor. Although, the method is disclosed in the context of an embedded servo system, the method may be used to write servo data on a dedicated servo surface.

BRIEF DESCRIPTION OF THE DRAWINGS

FIG. 2 is a partial plan view of a recording medium including servo data and informational data arranged according to the teachings of the present invention.

FIG. 3 is an enlarged view of a section of tracks constructed according to the present invention.

FIG. 4(a) is a schematic representation of the transitions in the recording medium of an odd servo data track written according to the present invention.

FIG. 4(b) is a schematic representation of the transitions in the recording medium of an even servo data track written according to the present invention.

FIG. 5(a) is a plot of the waveform generated by an odd servo data track of the present invention.

FIG. 5(b) is a plot of a waveform generated by an even servo data track of the present invention.

FIG. 6 is a plot of the demodulated position signal generated by the track following servo control system of the present invention.

DESCRIPTION OF THE PREFERRED EMBODIMENTS

Servo Control System

Figure 1:
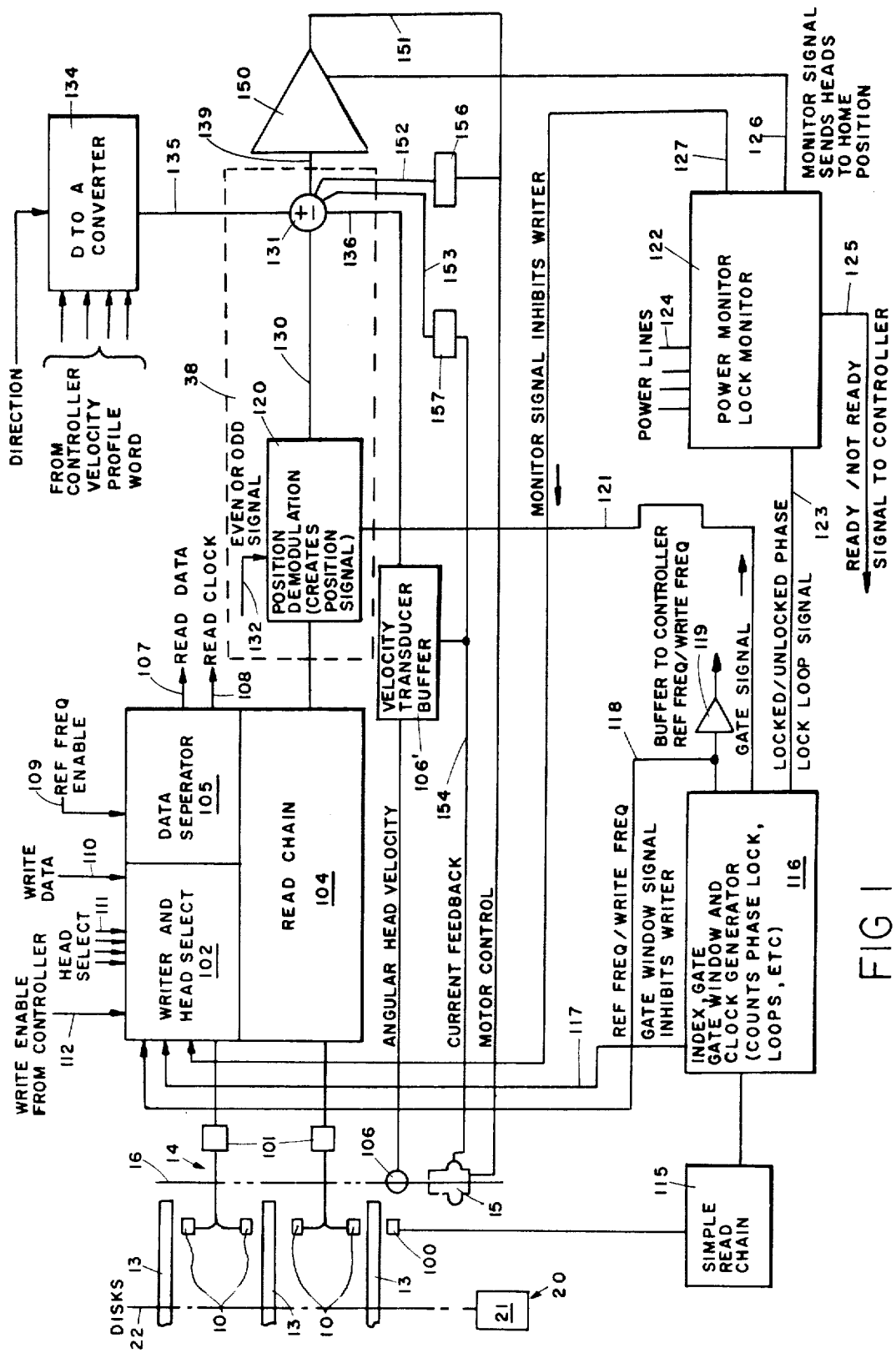
FIG. 1 is a functional diagram of the servo control system of the present invention.

Referring briefly now to FIG. 1, a servo system for positioning a plurality of read/write heads 10 relative to a storage medium such as a plurality of discs 13 is illustrated. The discs 13 are provided with a magnetizable medium disposed on the surfaces thereof such that data may be recorded and retrieved therefrom with the heads 10 in a conventional manner. Data is stored on the surface of the discs 13 in a plurality of concentric data tracks. Positioning means 14 is provided which is energizable for moving the read/write heads 10 to preselected recording positions or tracks on the discs 13. The positioning means 14 comprises a torque motor 15 which radially pivots a plurality of arms, not illustrated herein, about the axis 16. The radially pivoting arms support the read/write heads 10 adjacent the surfaces of the discs 13 where the read/write heads "fly" on a thin film of air when the discs 13 are rotated. Drive means 20 is provided to create relative movement between the discs 13 and the read/write heads 10 thereby enabling the transfer of data between the magnetic storage medium and the heads in a conventional manner. The drive means in this case comprises a direct drive motor 21 which spins the discs 13 about a central axis 22.

Referring now to FIG. 2, a section of one of the surfaces of the discs 13 is illustrated. Data carried on the surfaces of the disc 13 is arranged in a plurality of concentric tracks comprising alternate sectors of servo data 30 and informational data 31. The servo data sectors and informational data sectors are alternately arranged truncated pie-shaped sectors which together make up the annular array of data tracks previously referred to. In FIG. 2 the servo data sectors are shown for the purposes of illustration as having a size much greater than the actual size of the servo data sectors. In fact the servo data sectors constructed according to the present invention may be small enough to present an overhead of only approximately 2 percent.

With reference now to FIG. 3, which illustrates a greatly magnified section of the interface 35 disposed between servo data sectors 30 and informational data sectors 31, it is illustrated that the servo data sectors 30 comprise a plurality of side-by-side, closely spaced alternately arranged, odd and even servo data tracks (1) through (9). The odd and even servo tracks are alternately arranged such that pairs of odd and even servo tracks define a preselected position on the recording medium therebetween. Thus, for example, the pair of concentric servo tracks odd (1) and even (2) define a circular centerline 36 therebetween which becomes the centerline of informational data track odd (1). In a similar manner, the servo tracks even (2) and odd (3) define the informational data track even (2) which is centered on the line 37 extending therebetween. It should be understood the although the servo data tracks and informational data tracks are illustrated herein as being disposed in abutting side-by-side relationship, some spacing may be present between adjacent tracks. That is, adjacent tracks may be separated by a zone in the recording media that contains no prerecording information.

According to the present invention the pitch $P_3$ of the servo clock 30 and the pitch $P_i$ of the informational data is not constant at differential radial positions on the disc. That is to say, track density varies according to the radial position on the disc. Actual track density at any given location on the disc is determined by head performance according to the servo writing method of the present invention. In general, radial track density will be higher at the periphery of the disc where head performance is best and lower towards the interior of the disc where head performance deteriorates.

Preferably each of the odd and even servo data tracks generates a waveform in a read/write head 10 which can be demodulated to present a net DC component. The DC components of the odd and even tracks are equal in magnitude but opposite in polarity such that the DC components of the odd and even tracks cancel each other when the read/write heads 10 are disposed therebetween, such as when one of the transducers 10 is centered on the line 36 or 37. Thus, by nulling the output of the read/write heads over the servo data sectors 30, the heads 10 may be very precisely centered at predetermined radial locations on the disc which define the informational data tracks disposed in the sectors 31. Referring back now briefly to FIG. 1, a servo control means generally indicated by the numeral 38 is provided for sensing the output of the transducers 10 over the servo data sectors 30 and selectively energizing the positioning means 14 to accurately null the output of the read/write heads 10 and center the same on preselected tracks disposed in the informational data sectors 31.

With reference now to FIGS. 4(a) and (b) illustrating odd and even servo tracks, respectively, net positive and net negative DC signals are encoded on adjacent servo tracks by adjusting the order or direction and the timing of transitions in the recording media. A transition is herein defined as a change in the polarization of the recording media from north to south or south to north. Order herein refers to whether the transition is a transition from north to south or from south to north. North to south transitions are said to have an opposite order from south to north transitions and similarly, south to north transitions are said to have an opposite order from north to south transitions. The timing of the transitions refers to the spacing between adjacent transitions and is related to the frequency at which the transitions are written on the recording media. Referring now specifically to FIG. 4(a), a representative odd servo track 39 is illustrated. Each of the oppositely directed arrows 40 through 45 represent a transition in the recording media. As the gap of an electromagnetic transducer or head travels over the odd servo track 39, first flux is induced in the head gap in one direction and then as it passes a transition, flux is induced in the head gap in another direction. The way in which flux is oriented in adjacent zones of the servo data track determines the direction or order of the transition. An even servo track 49 constructed according to the present invention is illustrated in FIG. 4(b). Even servo tracks are written with transitions 50 through 55 having the same spacing or frequency as the transitions of the odd servo track that the order or direction of the transitions is identically opposite. That is, the order of the transitions of the even servo track 49 is inverted with respect to the order of the transitions of the odd servo track 39. The spacing or frequency of the transitions is identical, and although 180° phase shift between the odd and even servo tracks is preferred, a large phase error between the servo data tracks can be tolerated. It should be noted that thhe phasing of adjacent servo tracks in prior art amplitude sensitive schemes is critical to the success of these schemes. Since it is difficult to precisely phase a plurality of adjacent, very densely packed servo tracks, the present embedded servo writing technique greatly reduces the complexity of writing servo data.

As illustrated in FIGS. 4(a) and 4(b), each of the odd and even tracks 39 and 49, respectively, comprises an array of equally spaced transition pairs 60 and 61, respectively. Each of the transition pairs 60 and 61 comprises first and second equally spaced and oppositely directed transitions. The transition pairs 60 disposed in the odd track 39 are each provided with an identical order. That is to say, the order of transition pairs 40–41, 42–43 and 44–45 is identical. However, the order of the transition pairs 61 of even track 49 is identically opposite of the order of the transition pairs 60 of the odd track 39. Thus, although the transition pairs 50–51, 52–53 and 54–55 all are provided with an identical order; that order is identically opposite to the order of the transition pairs 60 of the odd track 39. The spacing $\lambda_1$ of the transitions comprising the transition pairs 60 and 61 is equal. The spacing $\lambda_2$ between transition pairs 60 and 61 is equal and larger than the spacing $\lambda_1$. The spacing $\lambda_1$ and $\lambda_2$ are actually representative of the two frequencies at which the transitions are written in the odd and even servo tracks $\lambda_1$ may be regarded as the basic frequency of the transitions appearing in the servo tracks and $\lambda_2$ may be regarded as a beating frequency that is impressed thereon. $\lambda_1$ is provided with a definite predetermined relationship with regard to $\lambda_2$ since it is the relationship of $\lambda_1$ to $\lambda_2$, in addition to the order of the transitions, that creates the desirable DC components of the odd and even servo tracks.

With reference now also to FIGS. 5(a) and 5(b), the decoding of the odd and even servo tracks 39 and 49 into waveforms 65 and 66 having net negative and net positive DC components, respectively, is illustrated. The output of the odd and even servo tracks is inputted into a comparator disposed within the servo control circuitry 39 of FIG. 1. The comparator may be any one of a number of commercially available circuits designed for use with the power level and servo data frequency rates chosen. The output of the comparator can be positioned at any desirable value. However, for the sake of illustration, in this case the comparator output is set to $+3$ or $-3$. In this case, if a net DC output of $+1$ and $-1$ is desired, the relationship of $\lambda_1$ to $\lambda_2$ is that $3\lambda_1$ equals $\lambda_2$, or $\lambda_1$ is to $\lambda_2$ as 3:1. With specific reference now to the odd track 39 and the waveforms 65 generated thereby, the first transition 40 sets the comparator output at 30 3. The second transition 41 of the transition pair 60 sets the output of the comparator to $-3$. The mean value of the excursion or the output of the comparator is zero. Note that this is the first that an amplitude or a reference voltage is required, and of course the output of the comparator may be placed at any desirable level. All the comparator senses at its input is the direction and timing of the transitions and because the spacing $\lambda_2$ between the transition pairs 60 is greater than the spacing $\lambda_1$ between the transitions 40 and 41, the waveform 65 generated by the odd data track 39 will have a negative DC component. More specifically, it is illustrated that the area 70 created by the excursion or output of the comparator between transitions 40 and 41 is equal to and is cancelled by the area 71 disposed between the transitions 41 and 42 of adjacent transition pairs 60. However, since $\lambda_2$, the spacing between the transition pairs 60, is three times $\lambda_1$, the spacing between the transition themselves, a net negative area 73 remains before the output of the comparator returns to $+3$ at transition 42. In a similar manner, transitions 42, 43 and 44 create a net negative area at 74. When filtered the negative areas 73 and 74 produce a net negative output of 1.

With specific reference now to FIGS. 4(b) and 5(b), it is illustrated that the even track 49 similarly generates a waveform 66 having a net DC component of $+1$ in the case where $\lambda_2$ equals three times $\lambda_1$, the output of the comparator is set at $+3$ and $-3$ and the order of the transitions of transition pairs 61 is identically opposite to the order of the transition pairs 61 is identically opposite to the order of the transition pairs 60 of the odd track 39. Thus, if either of the waveforms generated by the odd or even servo data tracks is filtered, a net plus or minus DC value will be measured purely because of the timing and order of the transitions of the odd and even servo data tracks. The only requirements are that the output of the comparator is stable and the timing and direction of the transitions is correct. Since the amplitude of the waveform generated by the transitions no longer carries servo control data, the demodulating circuitry required to generate the waveforms 65 and 66 is substantially reduced over that required in prior art servo data writing schemes. Specifically, an automatic gain control circuit (AGC) is no longer required. This eliminates problems heretofore encountered with unstable control circuitry and variations in amplitude created by problems in the servo writer's circuitry and recording medias having a nonuniform response. Elimination of the AGC also improves the time response of the servo control system and reduces its overhead since an AGC needs time to set up and it requires a substantial number of pulses to determine an average pulse amplitude. On the other hand if the transitions contained in the servo data sectors of the present invention are written with frequencies similar to that normally encountered in the informational data stream of the read/write heads much of the same circuitry is used to process both informational data and servo data. In fact, both of the odd and even servo tracks of the present invention may be written in conventional modified frequency modulated code (MFM) as a 110110110... data pattern.

Thus, if the gap of the read/write head is precisely centered over an odd servo track, a position signal of −1 is generated. If the read/write head is precisely centered over an even servo track, a position signal of +1 is generated. The next consideration is the signal resulting as the read/write head radially traverses adjacent odd and even servo tracks. With reference to FIG. 6, a waveform 80 is illustrated that represents an ideal demodulated position signal generated by a read/write head 10 radially traversing a servo data sector 30 (with slow constant radial motion) containing the aforementioned odd and even servo data tracks. With reference now also to FIG. 3, when the read/write head is precisely centered over servo track even (2), the output of the head is +1. However, as the head is radially traversed toward the servo track odd (3), the output of the read/write head will diminish until the output of the head is nulled on the line 37 defining the interface between servo data tracks even (2) and odd (3) and the precise center of informational track even (2). Thereafter, as the read/write head continues to radially traverse towards servo track odd (3), the output of the head gradually increases until a −1 value is reached when the read/write head is precisely centered over the servo track odd (3). Thereafter, as the read/write head continues to radially traverse over subsequent odd and even servo data tracks, the output of the head will periodically null defining either an odd or even informational data track. The signal illustrated in FIG. 6 is the demodulated position signal of the track following system of the present invention in the ideal case. Ideally, the signal is trapezoidal in nature and is formed from a plurality of linear segments. Actually, the signal is more rounded with the most linear portions of the demodulated position signal centered over the servo data tracks or informational data tracks. That is to say, the transitions between servo and informational data signals of the demodulated position signal are likely to be rounded somewhat due to the phasing of the odd and even servo data tracks and head geometry. The gap of the read/write head effectively varies according to the flying height of the head and since the relative velocity of the head with respect to the recording surface varies as the head is radially traversed across the disc the effective gap width of the head varies. The demodulated position signal is most likely to have a generally sinusoidal pattern varying from −1 to +1 when the head is precisely centered over an odd or even servo data track, respectively, with the output of the read/write head being nulled precisely over the informational data tracks disposed therebetween.

Although the phasing of adjacent odd and even servo data tracks in not critical, adjacent servo data tracks preferably are approximately 180° out of phase. If ajdacent odd and even servo data tracks are not so phased, the slope of the position signal 80 is not altered in the vicinity of the informational data tracks but rather will change somewhat in the area between adjacent servo data and informational data tracks. If adjacent odd and even servo data tracks are not provided with a 180° phase difference, the demodulated position signal will become somewhat more rounded and sinusoidal rather than having the trapezoidal shape illustrated in FIG. 6. That is to say, adjacent odd and even tracks having a 180° phase difference create a much more academic or ideal position signal. However, inaccuracy in the phasing of the servo data tracks does not substantially impair or reduce the accuracy of the demodulated position signal.

The present system also differs from other track following systems in that track identification information is not recorded with the servo data. The only information which the present system derives from the servo data bursts is the position signal. With reference now again to FIG. 2, the servo data sectors are indicated by the numeral 30 and the informational data sectors are indicated by the numeral 31. After each servo data sector 30 an informational data sector 31 is encountered. At the beginning of the informational data sector 31, a preamble is encountered at 83 and a cylinder identification is encountered at 84. Cylinder identification is referred to since if the machine is provided with multiple heads, all of the heads are said to be on the same cylinder. Each head produces a track such that if there are eight heads there are eight tracks per cylinder, all of the tracks in each cylinder not necessarily being disposed geometrically one above the other. That is, the read/write heads in the same cylinder may be displaced axially on different disc surfaces or may be displaced radially on a single disc surface. In fact, it is quite common for more than one read/write head to be positioned on each surface of the discs. The cylinder identifications are read through the informational data channel and to identify the position of the heads it is necessary to read the informational data channel and determine which cylinder the heads are disposed in. Thus, it is always necessary to read the first portion of the informational data sector. Although the remainder of the informational data sector is not important when the heads are radially traversing the disc, even when the heads are on the fly between different radial positions on the disc, it is possible to frequently read this portion of the informational data sector.

The preamble 83 is simply a uniform signal designed to set up the system electronically for reading data. For example, the preamble 83 is generally a string of uniform pulses written at a single frequency. After the cylinder identification 84, a cylinder CRC is disposed at 85. The cylinder CRC is a data check. Often cylinder CRCs involve reading a first set of data and then comparing it to a second set of data that is a function of the first set of data. If after reading the cylinder identification and the cylinder CRC it is determined that the cylinder identification has been read correctly for the purposes of positioning the remainder of the informational data sector has no function. The remainder of the informational data sector includes a sector identification 86, a track identification 87 and the customer's data that is to be read or written at 88. At the end of the customer's data 88, another CRC is disposed at 89. The CRC 89 is generally an error correction polynomial and the informational data sector is ended with a postamble at 90. The postamble 90 is a high frequency pulse train leading into the next servo data sector 30. The purpose of the postamble 90 is to use up space at the end of the informational data sector 31 for the purpose of margining. A small margining area is always required as a safety factor to insure that none of the customer's data recorded in the informational data sector at 88 is lost for lack of room.

The servo data sectors 30 are automatically protected electonically by gating circuitry. When the read/write heads are rapidly traversing the disc radially, the demodulated position signal is not continuous since the head move quite rapidly at full speed. Thus, when the heads are on the fly between different radial positions on the disc, the position signal is discontinuous average zero and the heads are moved according to a velocity profile specified by a controller. This velocity profile is updated each time the servo control system successfully reads a cylinder identification. Although the frequency of success in reading the cylinder identification decreases as the velocity increases, every time the system is successful at reading a cylinder identification at high speed, the accurate positioning of the heads is greatly facilitated. This of course also increases the indexing speed of the heads.

The servo control system also includes a clock for writing and indexing. One approach involves turning the discs at a constant speed and employing an absolute clock. Another technique involves less stringent control over the speed of the discs and provision of an actual clock that follows or tracks the speed of the discs. This latter approach is preferable and there are a number of approaches for generating a clock that actually tracks the disc rotational speed. One such approach is to use the missing pulse technique disclosed in U.S. Pat. No. 4,146,910 entitled Combined Speed Control And Sectoring Index For Disc Recorders And The Like the disclosure of which is incorporated herein by reference.

With reference now to FIG. 1, the preferred technique for creating an actual clock involves use of a single fixed magnetic head 100. The fixed head or clock head 100 tracks a portion of one of the surfaces of the disc 13 that is not tracked by the displaceable read/write heads 10. The fixed magnetic head 100 produces a pulse train similar to that of the optical pickup previously disclosed except that the transducer senses a clock track stored on the magnetic medium carried by the discs 13. In this case, instead of leaving out an aperture, the equivalent of two apertures or two pulses is provided for radially indexing the clock track. That is, a clock track is provided comprising an array of evenly spaced pulses with the exception that in one radial position on the clock track two additional transitions are provided generating an additional pulse. In the present case, 53,760 +2 transitions are provided in the clock track.

When the servo writer records the servo data sectors 30, a clock track is required. This clock track may be used as a clock track for the servo control system of the present invention. The clock track has to have the correct number of transitions and has to have an accurate closure. A clock track will be written according to the servo writing method of the present invention. Using the fixed head 100 and the servo writer's clock track, gate and gate window signals may be generated by the servo control system of the present invention. For the sake of illustration, assuming that 60 equally spaced sectors are provided with 53,760 clock transitions per revolution, plus the two index transitions, there are 896 transitions per sector. In terms of periods, that is, 448 clock periods per sector in the case where 60 servo data and informational data sectors are provided of equal size.

Each servo data sector 30 is protected by two signals, a gate window and a gate signal. The servo data is written within the gate signals. The customer's data is bounded by the gate window signals. The gate window signals encompass the gate signals, and the gate signal actually enables the servo data. The area between the edges of the gate window signals and the gate signals provided a buffered area where nothing is written for margining purposes. In time, the position of the gate window signals may shift relative to the surface that is being tracked. However, provided a margin guarantees that good positioning information will always be recovered. The gate window signals are also used to turn off the writer. Any time that the read/write heads are within a gate window, the heads are within a servo sector 30. Any time the read/write heads 10 are outside of the gate window signals, they are over informational data sector 31. Where there are 448 clock periods per sector, definition of the gate window and index signals is a matter of using countdown logic. If the disc is spun at 3,000 rpm, a clock frequency of 1.344 megacycles is provided. The clock necessary for writing data that is consistent with the type of head technology now available is 16.128 megacycles. The ratio of 16.128 to 1.344 is exactly 12.00. Therefore, to create a writing frequency or writing clock, it is necessary to phase lock loop the clock frequency generated by the fixed head 100 up to 16.128 megacycles divided by 12 and then compare back. The phase lock loop generates the writing frequency of 16.128 megacycles. Briefly then, the clock track generated by the fixed head 100 provides the gating signals that are necessary to find the servo data sectors 30 and actually serves as the reference by which the servo data sectors 30 are initially written. Furthermore, the clock track read by fixed head 100 produces a reference frequency that can be used to actually write the informational data contained at the informational data sectors 31. If the speed of discs vary, the performance of the system does not suffer since the same number of transitions or clock periods are provided per revolution of the discs.

With specific reference to FIG. 1, the block diagram of the servo control system of the present invention will be explained in greater detail. The number of discs 13 that the system will accommodate is variable. A number of read/write heads 10 may be associated with each disc 13, however, in this case only one read/write head is associated with each surface of the discs 13. Amplifying circuits at 101 are disposed on the head frame and are connected to head select electronics 102, read chain 104, and data separator 105. A full array of read/write heads 10 pivots about an axis 1 on a swing arm, not illustrated herein. A torque motor drives the swing arm to radially position heads 10 with respect to the discs 13. A velocity transducer 106 provides a measure of the velocity of the heads 10 as they radially traverse the discs 13.

All signals in the functional diagram of FIG. 1 that are provided with arrows indicate signals passing through a natural interface. All of these signals are entirely digital in nature and control the device that they are inputted to in a unique fashion. The data separator 105 provides read data and read clock signals at 107 and 108, respectively, which are inputted to the controller. A reference frequency enable signal is inputted to the data separator 105 at 109. The reference frequency enable signal is received from the controller. When the data separator 105 is not active, for example when the heads 10 are disposed in a gate or over a servo sector, the reference frequency (inputted at 118) is used to keep the data separator primed for the reception of data. The writer and head select circuitry 102 receives write data, head select, and write enable signals from the controller at 110, 111 and 112, respectively.

The output of the clock head 100 is inputted to a simple read amplifier chain 115. The output of the read chain 115 is directed to a clock generator 116 that counts clock periods from a phase lock loop to generate the index gate and gate window signals. The gate window signal is inputted to the writer and head select circuitry 102 on line 117. The reference and write frequency is generated by the clock generator 116 and is inputted to the writer and head select circuitry 102 on line 118. The reference and write frequency is also inputted to the controller via a suitable buffer 119. The gate signal is inputted to a position demodulation circuit 120 via line 121. A lock/unlock phase lock loop signal is generated by the clock generator and transmitted to a power monitor and lock monitor 122 along line 123. The power monitor and lock monitor compares various signals in the servo control system to norms to insure their correctness. Various power lines are inputted to the power monitor and lock monitor at 124 and the power monitor and lock monitor generates a ready/not ready signal inputted to the controller along line 125. A monitor signal along line 126 sends the heads 10 to home positions and a monitor signal along line 127 inhibits the writer when power goes down or the phase lock loop becomes unlocked.

The output of the read amplifier chain 104 is directed to the servo control circuit 38 which includes the position demodulation circuit 120. The position demodulation circuit 120 also receives the gate signal on line 121. The gate signals determine when the heads 10 are disposed above a servo data sector 30 on the discs 13 and enable the position demodulation circuit 120 to demodulate the position information generated by the read/write heads 10 and the servo data tracks 30. The position demodulation circuit 120 is basically a comparator with the characteristics previously discussed with respect to demodulation of the position signal. The output of the position demodulation circuit 120 on line 130 is the demodulated position signal 80 illustrated in FIG. 6. The demodulated position signal is inputted on line 130 to a summing node 131. An odd or even signal is also inputted to the position demodulation circuit 120 on line 132. The odd or even signal determines whether the heads 10 are to be stabilized between odd and even servo data tracks or even and odd servo data tracks. A digital to analog converter 134 receives a velocity profile word from the controller and supplies the same to summing node 131 along line 135. The controller is preprogrammed to provide a velocity profile for the heads 10 when it is desired to move the heads 10 from one predetermined position to another. The velocity transducer 106 generates a velocity measure that is inputted to a buffer circuit at 106′ the output of which is inputted to the summing node 131 along line 136. The summing node 131 compares the velocity word or velocity command from the controller to the velocity measure generated by the velocity transducer buffer circuit 106′, the error is amplified by the amplifier 150 which provides current on line 151 to drive the torque motor 15 and appropriately index the heads 10. The output of the position demodulator circuit 120 produces a maximum signal which is smaller than the least significant bit of the velocity profile word received from the digital to analog converter 134 and the velocity signal received from the buffer circuit 106′. Thus, whenever a control word or a velocity signal is present, these signals dominate the output of the summing node 131.

The circuit 150 is a high gain amplifier whose gain decreases as frequency increases and whose output on line 151 drives the torque motor 15. The amplifier 150 is suitably connected to the torque motor 15 in a manner that involves details of the servo control art that are not germane to the present invention. However, the summing node 131 also receives a motor voltage feedback signal and a motor current feedback signal on lines 152 and 153, respectively. The lines 152 and 153 are connected to motor control line 151 and current feedback line 154, respectively, via conditioning circuits 156 and 157, respectively. The conditioning circuits are compensation networks comprising conventional RC circuitry that becomes more conductive as frequency increases. At low frequencies the compensation networks are not conductive. However, as frequency increases the compensation networks become conductive to pass current and voltage feedback signals to summing node 131 to control the phase shift as the loop gain of the system approaches unity.

The odd or even signal received from the controller by the position demodulation circuit 120 along line 132 determines whether the servo control system stabilizes between odd or even servo tracks or vice versa. The system will stabilize under two possible conditions with an odd servo data track on the left, and an even servo data track on the right, or vice versa. Since the demodulated position signal is small relative to the size of the control word supplied by the digital to analogue converter, that is, the total excursion of the demodulated position signal is smaller than the least significant bit of the digital to analogue converter, any time that there is a command signal, the demodulated position signal is simply overpowered by the command word. However, when the command signal is reduced to zero, the demodulated position signal dominates the summing node 131 and the output on line 139 of summing node 131 is purely a function of the demodulated position signal. When the command signal is reduced to zero, the system automatically stabilizes between odd and even tracks or even and odd tracks according to the information supplied by the controller along line 132. The operation of the system can be analogized to an automobile driving along a washboard road. Whenever the automobile stops, it automatically comes to rest in a wash. In the present case, when the control word is reduced to zero, the system simply detents into position between the appropriate servo data tracks. More specifically, when the control word is reduced to zero, the system attempts to reduce either the velocity signal received on line 136, or the demodulated position signal received on line 130 to zero. The demodulated position signal can only be reduced to zero in one location between odd and even servo data tracks and identically centered over an informational data track so that once the control and the velocity words are reduced to zero, the system simply detents in place on the desired informational data track. Going back to the analogy of the vehicle on a washboard road, if it were posible to turn the washboard road upside down, this would duplicate the effect of the odd and even signal received from the controller on line 132, that is, changing the odd, even signal received on line 132 causes detenting on hills rather than valleys.

The position demodulator circuit 120 only holds the value of the servo data sector between gates so that it acts as a sample and hold circuit sampling position between the gates and then holding it until the next set of gates. Thus, the position demodulator circuit 120 is dormant between gates. If the odd/even signal were changed, the system would immediately become unstable on the informational track that it is locked on and it would shift immediately to an adjacent informational data track.

SERVO WRITING METHOD

Figure 7:
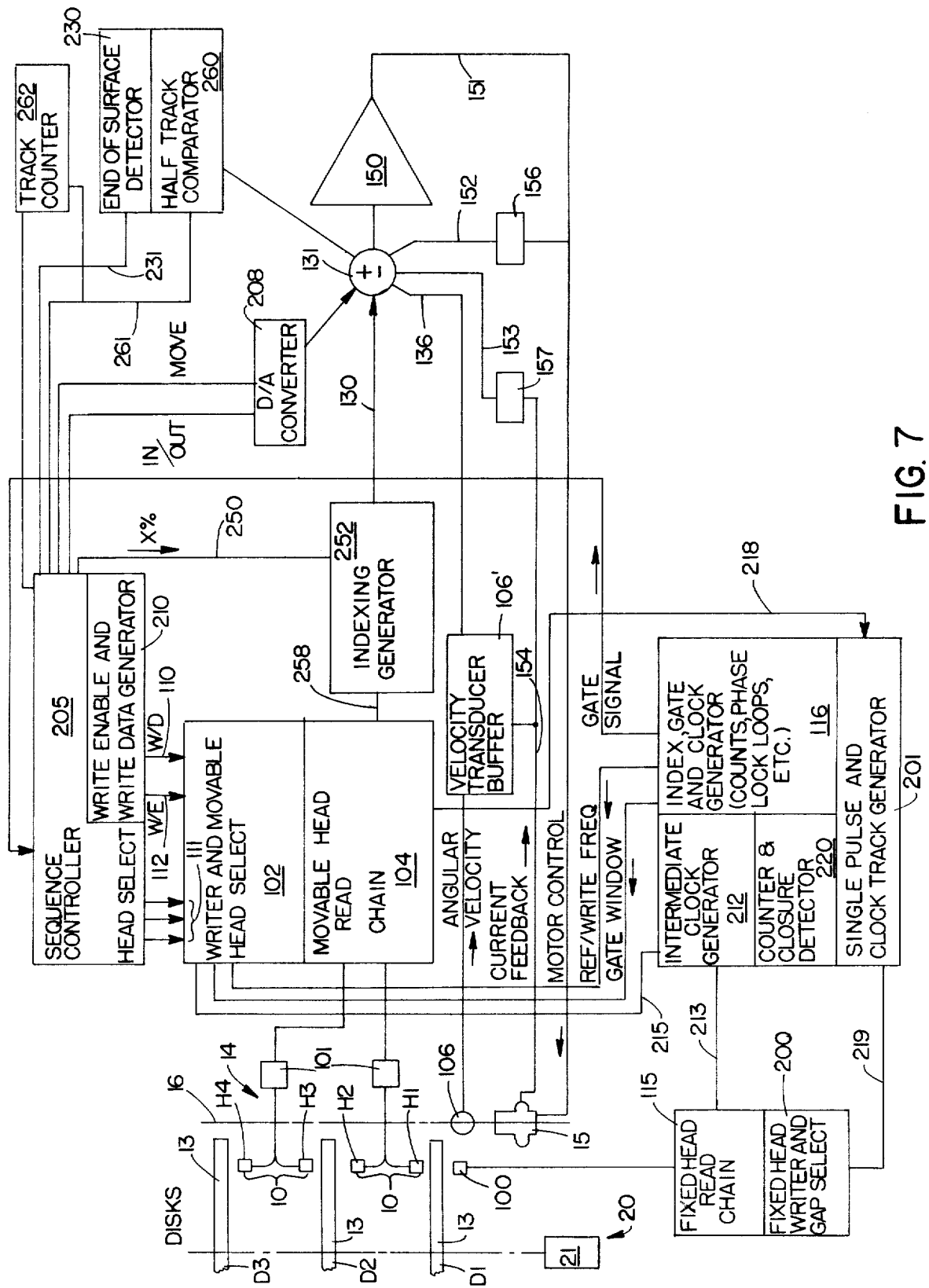
FIG. 7 is a functional diagram of the servo writer of the present invention.

With reference now to FIG. 7, a functional diagram of the servo writer is illustrated. Components common both to the servo control system and the servo writer are given the same numeral designation. Much of the equipment and circuitry present in the servo control mechanism for the disc recorder is used in the servo writer. For example, the same read/write heads and positioning motor for the servo control system are used in the servo writer. The additional circuits required for writing servo are of the same general type used in the servo control system and may, for example, simply be plugged into the recording disc for writing servo only. This, for example, would normally take place at the end of a production line and a relatively few number of servo writing circuits may be used to initialize a large number of recording discs. This provides a substantial cost savings over prior art servo writing techniques that involve complex mechanical arrangements for very precisely positioning the servo writing heads and/or the use of laser interferometry techniques for monitoring the position of the servo writing heads. In contrast, the servo writer of the present invention writes servo with the very same heads and servo control mechanism that is later to be used to read and write data.

Figure 8:
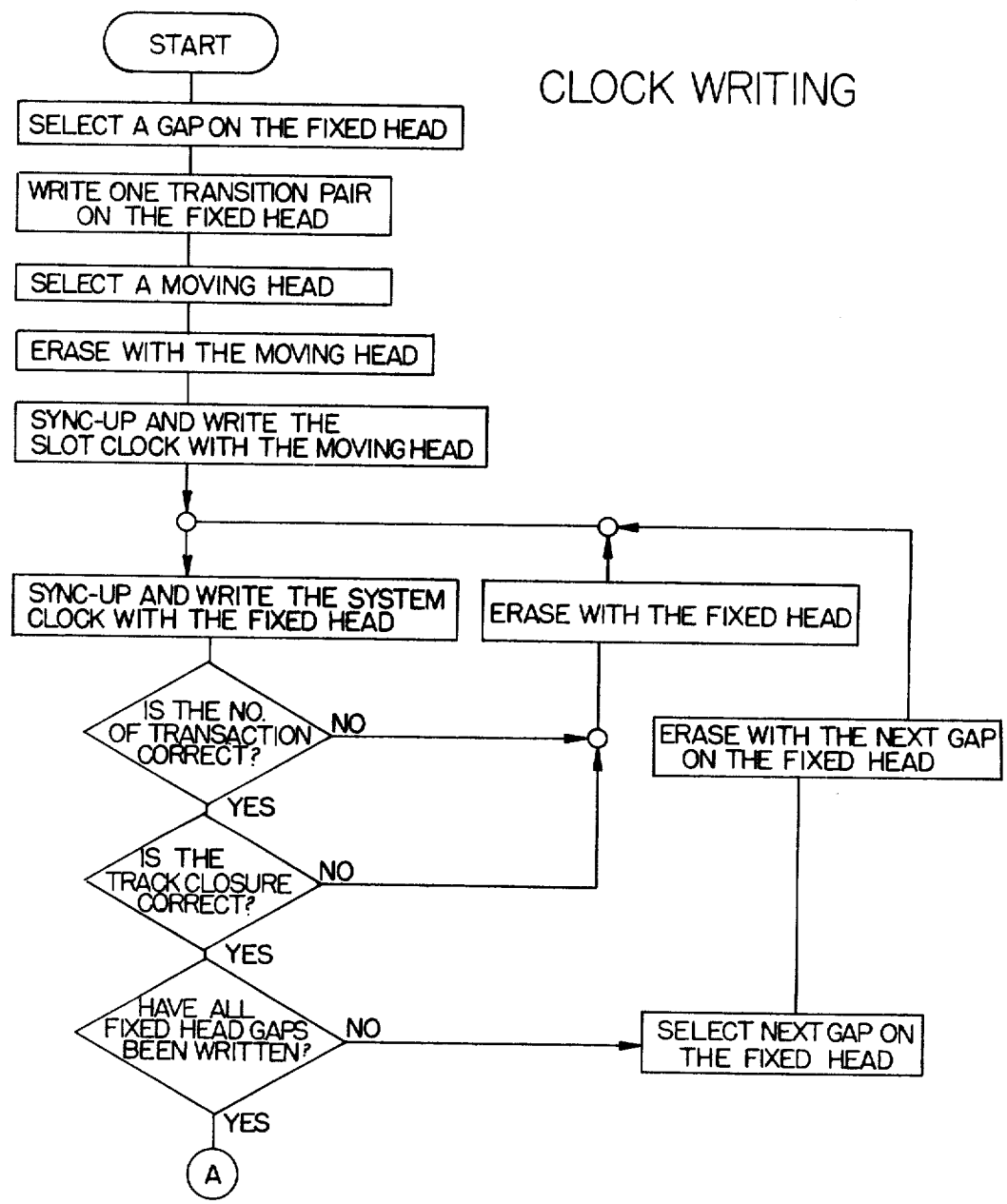
FIG. 8 is a flow chart of the clock writing method of the present invention.

With reference now to FIG. 8, as well as FIG. 7, a flow chart of the clock writing portion of the servo writing method is illustrated. A clock track is necessary for the operation of the servo writer and the servo control system. As previously discussed, an actual clock that follows or tracks the speed of the discs is preferred. In this case, the actual clock is generated by a fixed head 100 that reads a clock track magnetically written on one of the surfaces of the discs 13 such as the lower surface of the disc D1. When the disc recorder is first assembled, the medium of the disc 13 does not contain a clock track.

According to the present invention, a clock track is written by writing an initial pulse with one head, phase lock looping the single pulse up to an intermediate clock that is written on another head and then phase lock looping again up to a final clock that is written with a dedicated clock track head.

More specifically, the servo writing method of the present invention employs at least two read/write heads or gaps on a recording head that are capable of reading and writing data. In this case, the fixed clock track head 100 and one of the moving heads H1 through H4 are used for writing a clock track. The first step of the method is to choose a predetermined number of transition pairs N for the clock track. In choosing a number of transition pairs N, it must be considered that the clock track which is used to write servo is also used to later establish a system clock for the recorder. An extra pulse or a missing pulse is also provided on the clock track to establish an index from which sectorial information is generated. The fixed clock track head 100 is a type of read/write head having a plurality of gaps with which data may be read and written independently. A fixed head writer and gap select circuit 200 selects one of the gaps of the fixed head 100. Using single pulse and clock generator circuit 201, a single pair of transitions is written with the gap selected on fixed head 100. A sequence controller 205 then chooses one of the moving heads 10 associated with the discs 13. In this case, four moving heads H1 through H4 are provided along with three magnetic storage discs D1 through D3. However, it should be understood that the servo writing method of the present invention is compatible with many different types of systems employing one or a plurality of discs and having one or more moving heads associated with each surface of the discs. Assuming that the movable read/write head H1 is chosen, the sequence controller 208 then issues a move command to D/A convertor 208 that reciprocates the head H1 to its outermost radial position. When the head H1 is resting on a mechanical limit stop defining the outermost limit of the range of travel of the positioner, the sequence controllor erases with the head H1 by issuing a write enable signal on line 112 from write enable and write data generator 210 while failing to issue a signal on the write data line 110. After head H1 has been erased, the single pair of transitions written on fixed head 100 is read by fixed read chain 115. The single electrical pulse generated by the fixed read head chain 115 is inputted to an intermediate clock generator 212 on line 213. The intermediate clock generator 212 phase lock loops the single electrical pulse received on line 213 to a number of electrical pulses approximately equal to the square root of N, with a predetermined index which may comprise, for example, one missing pulse or one additional pulse. This signal is then inputted to the writer and head select circuit 102 on line 215. The writer and head select circuit 102 then writes on head H1 a number of transition pairs equal to the square root of N to thus create an intermediate clock track written on the top surface of disc D1 opposite that of the fixed head 100. Thereafter, the intermediate clock track is read through read chain 104 to create a number of electrical pulses equal to the square root of N. This signal is then inputted to signal pulse and clock track generator 201 on line 218. The signal pulse and clock track generator circuit 201 phase lock loops the signal received on 218 up to N electrical pulses with a predetermined index comprising either one missing pulse or one additional pulse. This signal is then inputted to fixed head writer and gap select circuit 200 on line 219 and N transition pairs plus a measure of index are written on fixed head 100 to create a clock track which is used for servo writing as well as a system clock.

After N transitions plus an index is written on fixed head 100, the clock track is read through fixed head read chain 115 and line 213 by counter and closure detector circuit 220. The circuit 220 ensures that the correct number of transition pairs is provided on the clock track and that the clock track is provided with a proper closure. That is to say, the circuit 220 checks to see that the beginning and end of the clock track properly interface. If the clock track written on the fixed head 100 is not provided with the correct number of transitions, or if the closure does not meet specifications, the fixed head 100 is erased and the intermediate clock track is again read by head H1, phase lock looped up to N, and the clock track is rewritten on fixed head 100. This process is repeated until a clock track is written which has the correct number of transitions and closure. If a clock track is written which meets the aforementioned requirements, a second gap on fixed head 100 is chosen and a second or redundant clock track is written on the second gap of fixed head 100 by reading the intermediate clock with moving head H1 and phase lock looping up to the frequency of the clock track in the manner previously set forth. Normally, the fixed head 100 is provided with as many as three read/write gaps and the intermediate clock is normally used to write clock tracks on each one of the gaps. Although only one track is needed for the operation of the servo writer or for use as a system clock, the other gaps provide some redundancy that is useful if one of the clock tracks deteriorate.

Figure 9:
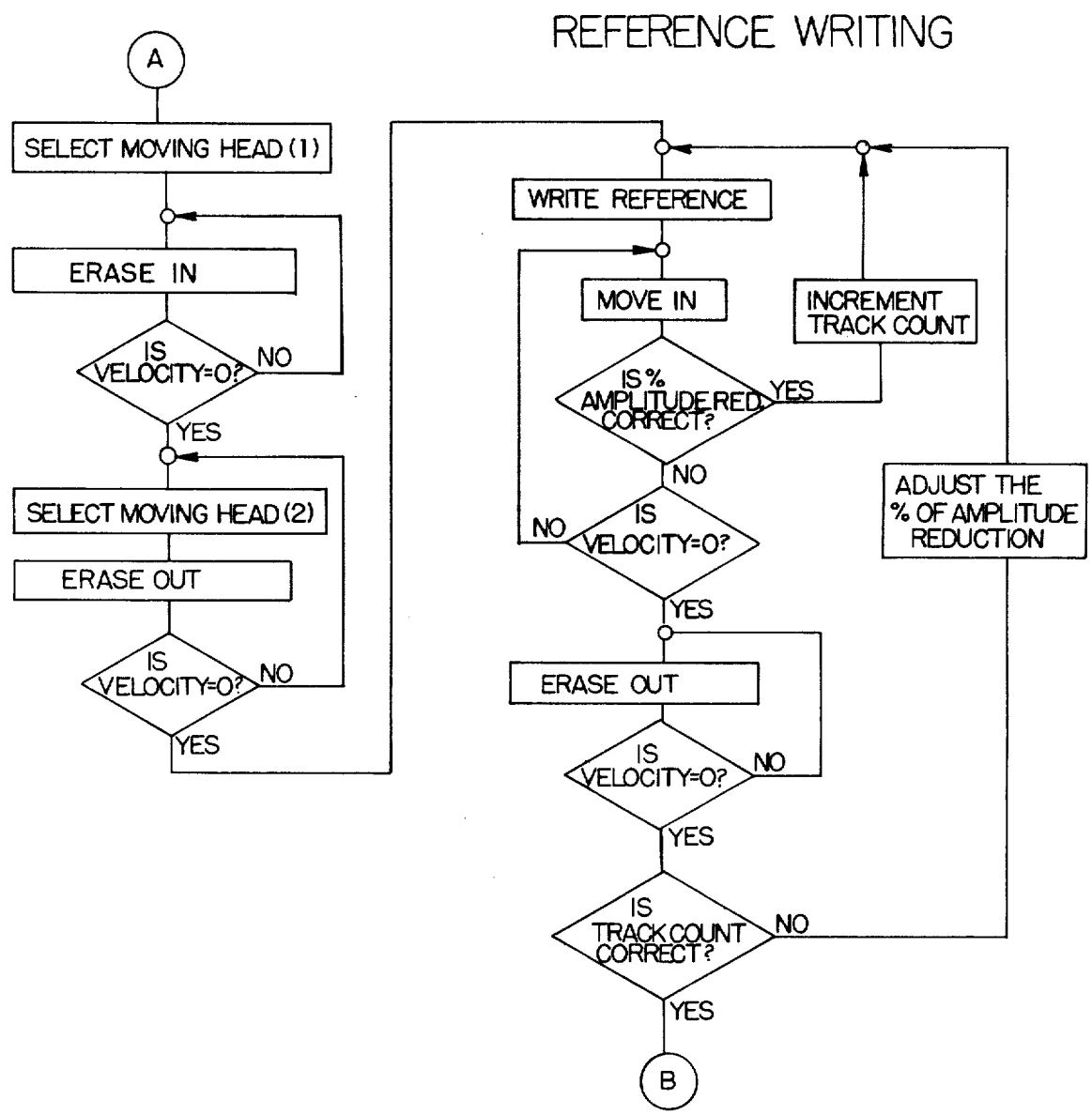
FIG. 9 is a flow chart of the reference writing method of the present invention.

With reference now to FIG. 9, as well as FIG. 7, a flow chart of the reference writing portion of the servo writing method of the present invention is illustrated. The reference writing portion of the servo writing method involves the determination of a reduction number which provides a predetermined desired average track density for a given head and disc. The reference writing process is a method for determining pitch or radial position before the servo data is written. After servo data is written, in the operation of the system, the servo data is used to create a position signal.

According to the present invention, the pitch or track density at any given radial location on the disc varies and is a function of head performance at different radial locations on the disc. The performance of the read/write heads 10 effectively vary according to the flying height of the head above the discs 13 and since the relative velocity of the head with respect to the recording surface varies as the head is radially traversed across the disc, the effective gap width of the head varies. This phenomenon, as well as differences in the relative velocity between the head and the recording surface, as well as differences in the radius of any given track at different radial positions on the disc cause the performance of the heads to vary at different radial positions on the disc. In general, head performance is better and track widths are more narrow toward the exterior of the disc. In the past, system performance and total track density were limited by the performance of the heads on the interior of the disc. This problem is obviated by the servo writing method of the present invention since according to the present invention, local track density or pitch is variable and is a function of head performance. More specifically, according to the present invention, local track density or pitch is determined by writing a reference track and stepping away from the track radially until the amplitude of the reference track written is reduced to X% of its original value. A second reference track is then written and the head is again stepped off to the point at which the amplitude of the second reference track is reduced to X% of its original value. The X% value is referred to as the reduction rate and this reduction rate is chosen such that the distance between each reference track approximates a half track position for either the servo data or informational data which is later to be written on the disc. The reduction rate is also varied to vary the total number of tracks disposed on the disc or the average track density. The amount by which the head is displaced radially to reduce the amplitude of the reference track to X% of its original value is of course variable depending on the radial position of the head and the performance of the head at different locations on the disc.

With particular reference now to the flow chart of FIG. 9, the desired reduction rate for a given average track density is determined according to the following method. It is desirable to completely erase the surface of the disc upon which reference is to be written. Thus, sequence controller 205 selects moving head H1, issues a command to spiral moving head H1 inwardly to its innermost stop while it issues a write enable command with no corresponding write data signal. This spirals head H1 inwardly completely erasing the upper surface of disc D1. When the end of surface detector 230 senses that the velocity of head H1 is reduced to zero, a signal is issued on line 231 indicating to the sequence controller that the innermost radial stop of the control arm 14 has been reached. The sequence controller 205 then selects moving head H2, issues a move out command to D/A convertor 208 and erases as moving head H2 spirals outwardly towards the outermost radial stop of control arm 14. When the end of surface detector 230 senses that velocity is again reduced to zero, a signal is issued on line 231 that indicates to the sequence controller 205 that the control arm 14 is again at rest upon its outermost radial stop. In a similar fashion, the surfaces of the other discs associated with heads H3 and H4 can be erased.

Figure 12:
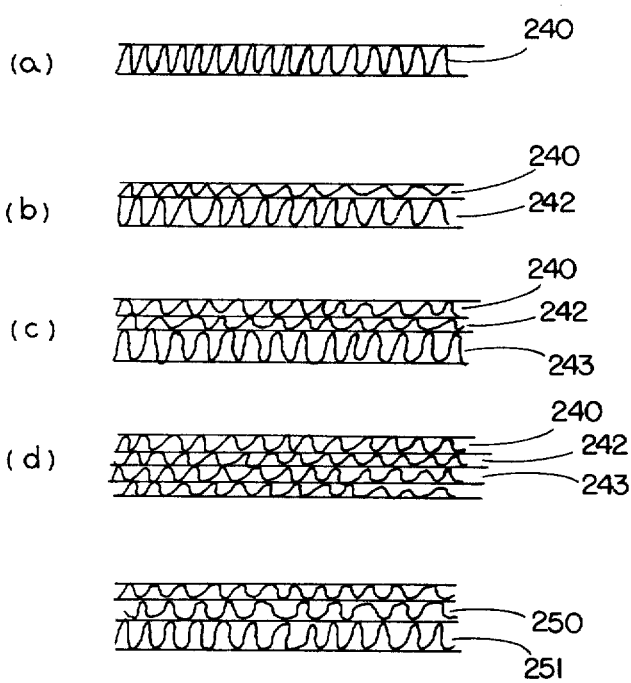
FIGS. 12(a) through 12(b) are partial views of the surface of a magnetic disc upon which reference tracks are successively written.

With the head H2 now resting against the outermost limit stop of the range of travel of the positioner, a reference track is written with moving head H2. With reference now also to FIG. 12(a) which is an enlarged view of a portion of the surface of the disc D2, the first reference track 240 is illustrated. The frequency of the track which is written at 240 is relatively high to insure a strong signal when the reference track is read. The reduction rate is initially chosen based on empirical considerations and the average track density which is ultimately desired. In the case where reference tracks are used to define half track positions, an initial reduction rate of approximately 40% is chosen, although depending on the type of head used and the desired track density, an X% value in the range of 25% to 50% may be used. The sequence controller establishes the reduction rate X%, and inputs it to the indexing generator 252 on line 250. When the reference track written with head H2 is read through read chain 104, the signal is inputted to indexing generator 252 on line 258. The indexing generator 252 produces an output on line 130 which is proportional to the difference between the full amplitude of the signal received on line 258 and X% of the full amplitude of the signal received on line 258. Thus, if the X% value or reduction rate is set at 40% the signal appearing on line 130 will equal 60% of the full amplitude of the signal inputted to indexing generator 252 on line 258. This creates an imbalance at the summing node 131 which instructs the servo control system to move the head H2. The head H2 moves until the output of the indexing generator 252 is reduced to zero. At the point which the output of indexing generator 252 is reduced to zero, the head H2 is reading only 40% of the full amplitude of the first reference track 240. If the correct reduction rate for a given desired average track density has been chosen, this point marks a half track position between servo data and informational data tracks.

Once the head H2 has been displaced to the point at which it reads X% of the full amplitude of first reference track 240, a second reference track 242 is written with head H2 as illustrated in FIG. 12(b). The second reference track 242 overlaps the first reference track 240 in the manner illustrated. Thereafter, the second reference track 242 is read, the sequence controller 205 issues the X% signal and the output of the indexing generator 252 is reduced to zero in the manner previously set forth by displacing the moving head H2 to the point at which the original amplitude of the second reference track 242 is reduced to X% of its full amplitude. If the reduction rate has been correctly chosen, this position accurately defines the radial position of one of the servo data or informational data tracks. Thereafter, the moving head H2 is again stepped off radially to the point at which the amplitude of the second reference track 242 is reduced to X% of its original amplitude. At this point a third reference track 243, as illustrated in FIG. 12(c) is written partially overlapping the second reference track 242.

Figure 11:
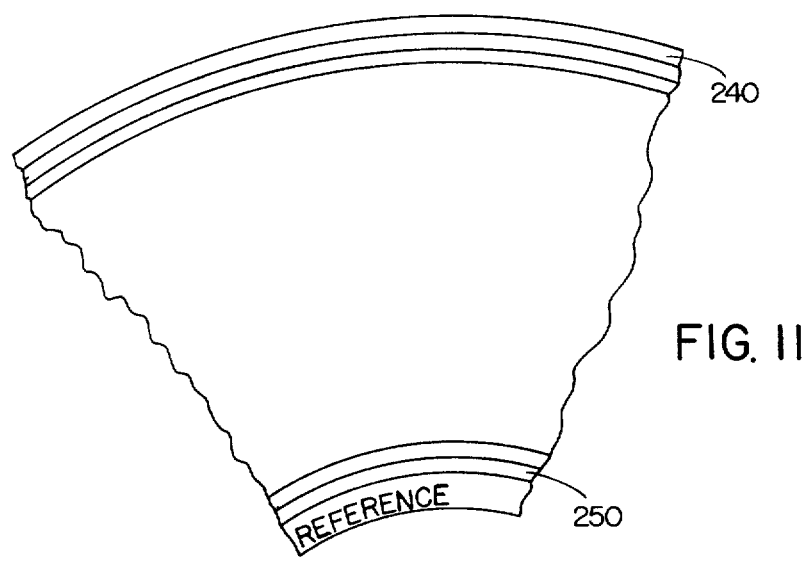
FIG. 11 is a partial plan view of a magnetic storage disc filled with reference tracks.

As illustrated, in FIGS. 11 and 12(d), this process is continued until the lower surface of the disc D2, which the head H2 radially traverses, is completely covered with reference tracks. A half track comparator 260 is connected to the summing node 131 for detecting each half track position. The half track comparator 260 produces a signal on line 261 when a half track position is reached. A track counter 262 senses the output of half track comparator 260 and totals the number of half tracks written. The track count is incremented each time a reference track is written. When the moving head H2 reaches the innermost mechanical stop of the range of travel of the positioner, the servo control system will be unable to reduce the output of the indexing generator 252 to zero, since the mechanical stop does not allow further displacement of the moving head H2. Arrival of the moving head H2 at the innermost radial stop is confirmed if the X% point cannot be reached and the velocity is also equal to zero. When these two conditions occur, the entire recording surface of the disc D2 is filled with reference tracks as illustrated in FIGS. 12(d) and 11. More specifically, the surface of the disc is covered with a plurality of overlapping reference tracks 240 through 250 with one full width last reference track 251 which is written just before the innermost radial stop is reached.

When the two aforementioned conditions coexist and arrival at the innermost radial stop is confirmed, the sequence controller orders an erase and spirals the moving head H2 outward to the outermost radial stop of the positioner. At this point, the track count is checked to see if it is within a desirable range. Average servo track density is calculated by dividing the total number of reference tracks written by (2) and the radial distance traversed by the positioner. If the average track density calculated is high, the reduction rate, X%, is lowered and the reference writing steps are repeated on the recently erased surface of the disc D2. If the calculated average track density is low, the reduction rate X% is increased and the reference writing steps are again carried out on the recently erased surface of the disc D2. If the calculated average track density is within a predetermined range of the desired average track density, the reference writing step is completed, the correct reduction rate for a predetermined average track density has been determined, and the servo writer proceeds to the portion of the method in which the servo is actually written on the magnetic storage disc.

Figure 10:
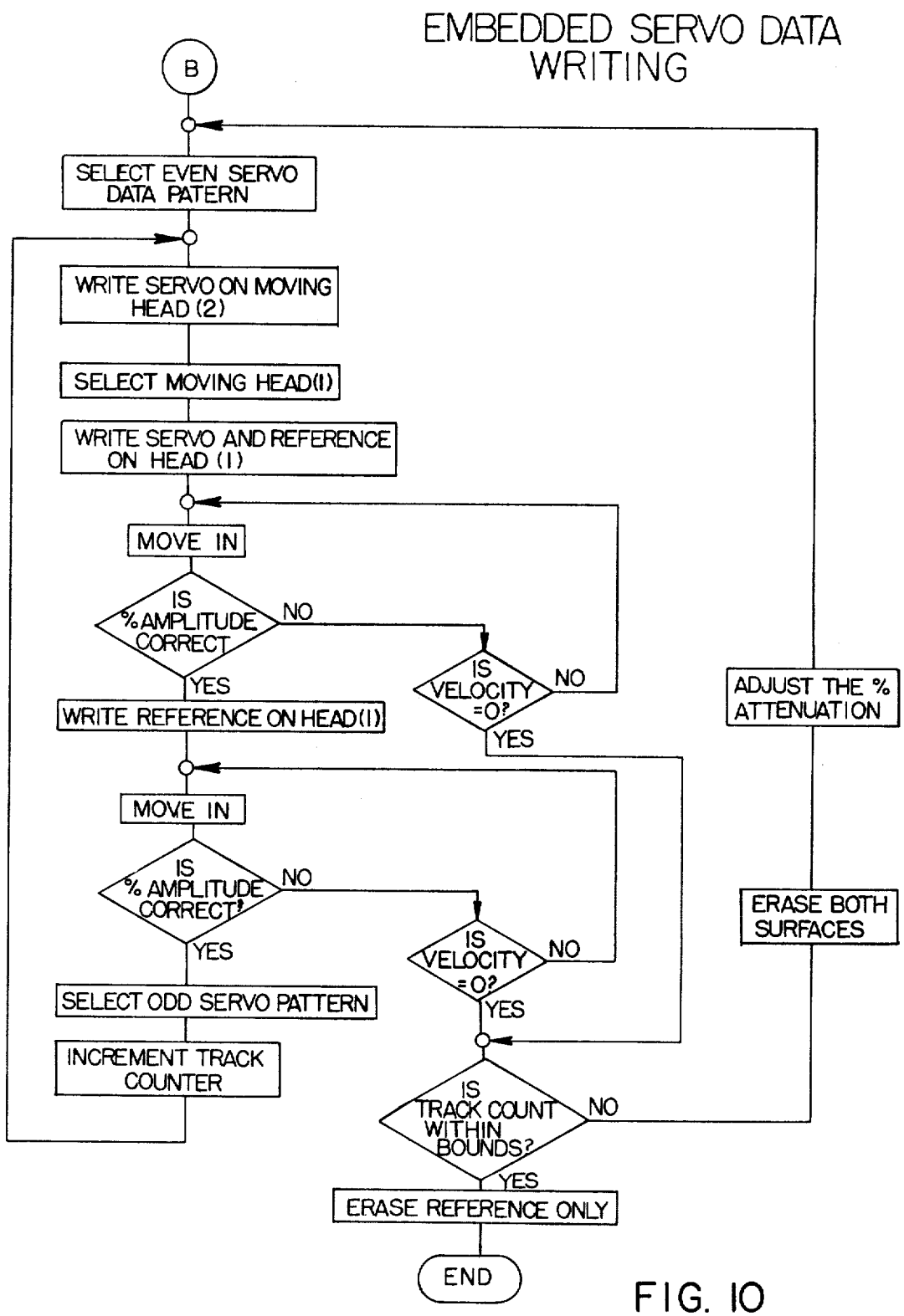
FIG. 10 is a flow chart of the servo data writing method of the present invention.

With reference now to FIGS. 10 and 2, a flow chart of the portion of the servo writing method during which embedded servo data is actually written is illustrated. According to the method of the present invention, servo data is written in pie-shaped sectors 30 on the discs 13, the pie-shaped sectors being defined by gate signals generated by index gate and clock generator 116 from the clock track read by fixed clock track head 100. These gate signals define a plurality of servo data sectors 30 which are interposed between adjacent informational data sectors 31 as illustrated in FIG. 2. As previously discussed, with regard to the servo control system, the informational data sectors are considerably larger than the servo data sectors. The servo data sectors contain information coded in a manner such that it is later demodulated by the servo control system into a position signal which is used to accurately position the moving heads over predetermined radial positions or informational data tracks on the discs 13.

The servo writing method of the present invention is illustrated by way of example, in the context of a system that employs a specific servo data coding technique involving the use of adjacent odd and even servo tracks which define an informational data track therebetween. The odd and even servo data tracks contain position information coded with a frequency coding technique. However, it should be understood and it will hereinafter be explained, that the servo writing technique of the present invention is equally applicable to the writing of embedded servo data employing other types of servo data codes and position demodulating techniques. Also, it will be apparent that the servo writing technique is also applicable to only one head and one recording surface but the example specifically illustrated herein involves a recorder having multiple heads and multiple recording surfaces. In the case where the recorder contains multiple recording surfaces and multiple heads, reference tracks are only written on one surface for the purpose of determining pitch. Thereafter, servo data is written on all of the heads which are ganged in a similar manner on a common positioning arm, it being assumed that identical heads similarly mounted on a common positioning arm and having substantially identical relationships with a magnetic storage disc will have similar performance characteristics at different radial positions on the disc.

With specific reference now to the flow chart of FIG. 10 and FIGS. 13(a) through 13(l), the sequence controller first selects an even servo data pattern and writes the even servo data pattern on moving head H2 in the servo data sectors 30. If servo is to be simultaneously written on all of the discs D1 through D3, heads H3 and H4 are sequentially or simultaneously selected and servo data is written in the servo data sectors of the remaining surfaces of discs D2 and D3. Hereinafter, in the description of the method it is assumed that if all of the surfaces of the disc are to be written, whenever an operation is carried out on head H2, the same operation is sequentially or simultaneously carried out on the remaining heads H3 and H4.

Figure 13:
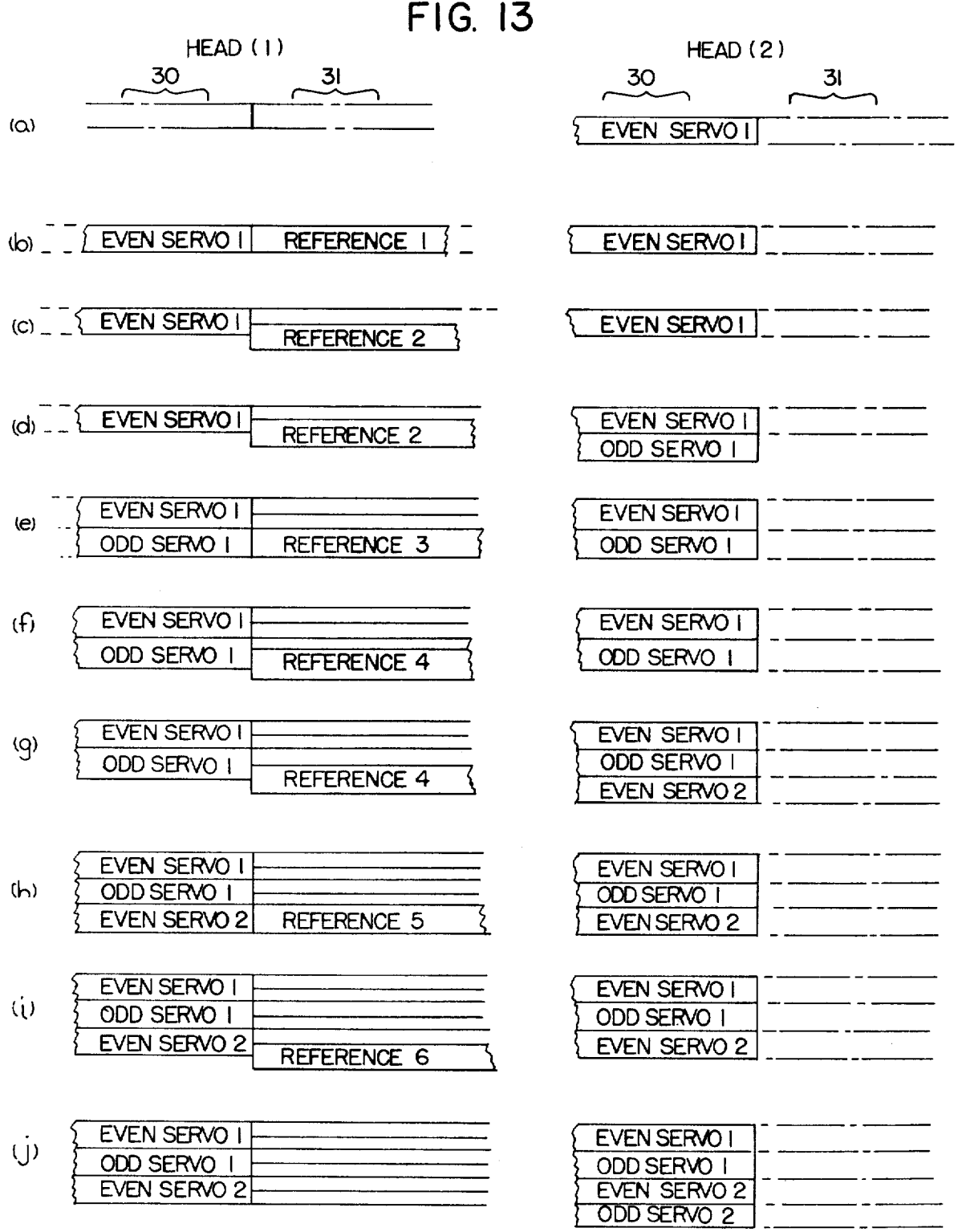
FIGS. 13(a) through 13(l) are illustrations of a portion of a magnetic recording disc upon which servo data and reference tracks are successively written.

After these initial steps of the method, the disc surfaces associated with heads H1 and H2, contain the information appearing in FIG. 13(a). More specifically, the surface associated with head H1 bears no information while the surface associated with head H2 contains even servo data track 1. After even servo data track 1 is written on moving head H2, the sequence controller selects moving head H1 and writes even servo track 1 in the servo data track sectors of disc D1 and reference track 1 in the informational data sectors of disc D1. The result is illustrated in FIG. 13(b). The sequence controller then reads reference track 1, issue the X% reduction word on line 250 and the servo control system reduces the output of indexing generator 252 to zero, moving head H1 to the position at which it reads X% of the original amplitude of reference track 1. At this point, the sequence controller writes a second reference track 2 on moving head H1, as illustrated in FIG. 15(c). Thereafter, the sequence controller moves head H1 to the point at which it reads X% of the original amplitude of reference track 2. Reference track 2 defines the second full servo track position on the discs. At this point, the sequence controller selects the odd servo pattern and head H2 and writes odd servo track 1 on head H2, as illustrated in FIG. 13(d). The sequence controller than selects head H1 and writes odd servo track 1 and reference track 3 in the servo data sectors 30 and reference data sectors 31, respectively, of the surface of disc D1 as illustrated in FIG. 13(e). Thereafter, the sequence controller again commands the servo control system to radially displace moving head 1 to the point at which the had H1 reads X% of the original amplitude of reference track 3. At this point reference track 4 is written with moving head 1 as illustrated in FIG. 13(f). Thereafter, sequence controller again moves movable head H1 to the point at which it reads X% of the original amplitude of reference track 4. This defines the radial position of the next full servo data track and the sequence controller then selects the even servo pattern and writes the even servo track 2 with read H2 as illustrated in FIG. 13(g). The sequence controller again selects moving head H1 and writes even servo and reference. This process is continued until, as illustrated in FIG. 13(k), the last servo track L, and reference track L are written on head H1 and the last servo track L is written on head H2. The sequence controller senses the last servo track and reference tracks when it is not possible to reduce the output of the indexing generator to zero, and the velocity is simultaneously equal to zero. These two conditions confirm that the moving heads have reached the innermost radial stop of the positioner. The process may end after writing either an odd or even servo pattern.

During this process, the track counter 262 is again incremented each time a reference track is written. After the sequence controller senses that the innermost radial stop has been reached, the average track density is calculated and if the track count is within bounds, the sequence controller orders the moving head H1 to spiral outwardly and at the same time orders an erase in the informational data sectors 31 on disc D1. At this point, the embedded servo data has been written on the sectors of all of the discs D1 through D3 and the method is complete. Thereafter, the servo control circuits are able to demodulate a position signal from the odd and even servo data disposed in the servo data sectors 30 interposed between informational data sectors 31 on each of the discs D1 through D3. If the track count is not within bounds, all of the surfaces of the discs D1 through D3 are erased, the reduction rate is adjusted either upwardly or downwardly, and servo data is again written according to the aforementioned servo writing steps.

It should be understood that in the case where only one disc and one moving head is used, such as the head H1, the aforementioned method is greatly simplified in that the moving head is radially stepped across the surface of the disc alternately writing even and odd servo every time two reference tracks are written. In the specific example disclosed herein, where multiple heads and discs are separately written with servo data, it is desirable to establish position with one head by writing reference with that one had, stepping away to the X% percentage point and then writing the next servo data track either simultaneously or sequentially on the other heads slaved from the head upon which reference is written. Once servo is written on these remaining heads, the head upon which reference is written is written with both the next servo track and the next reference track. This sequence is important since if the next servo track and reference track were first written on the moving head H1 upon which reference is being written, the position at which th servo tracks on the remaining heads is to be written would be lost.

From the foregoing, it should also be abundantly clear that the servo writing method of the present invention is not limited to the odd and even servo data coding technique disclosed herein. Once the correct reduction rate is determined for a predetermined average track density and given head technology, the heads may be used to write reference and determine half track positions in the manner previously outlined and the servo writer can write any one of an infinite variety of servo data codes. These codes may be used to identify individual informational data tracks centered between adjacent servo tracks or may be of a type which identify an individual informational data track that is centered colinearly with each of the servo data tracks. These differences simply relate to the way the position signal is demodulated and translate into differences in the servo control system which are unrelated to the method of servo writing.

In a case where only one disc and one movable head are provided, the servo-reference writing may be used to determine pitch rather than the reference-only writing now preferred. This will save one iteration when writing servo on a one-disc system. It is preferably to use the reference-only writing steps to determine pitch when writing servo with multiple discs and heads because if the pitch is incorrect it is not necessary to erase multiple surfaces.

The above description should be considered as exemplary and that of the preferred embodiment only. The true spirit and scope of the present invention should be determined by reference to the appended claims. It is desired to include within the appended claims all such modifications of the invention that come within the proper scope of the invention.

The embodiments of the invention in which an exclusive property or privilege is claimed are defined as follows:

1. A servo system for positioning a read/write transducer relative to a magnetic storage disc to read and write data stored on the disc, said servo system comprising:

positioning means energizable for moving the read/write transducer to preselected radial recording positions on said disc;

drive means for providing relative movement between said disc and the read/write transducer thereby enabling the transfer of data beween said disc and the read/write transducer;

a plurality of side-by-side, closely-spaced servo tracks recorded on said disc, said servo tracks identifying said preselected radial recording positions on said disc;

said servo tracks being provided with a nonuniform radial track density, said track density of said servo tracks varying substantially continuously from track to track according to the performance of the read/write transducer common to said tracks from generally more dense at the periphery of said disc where transducer performance is high to generally less dense at the interior of said disc where transducer performance is low;

servo control means for sensing the output of the read/write transducer and selectively energizing said positioning means for positioning said read/write transducer at preselected radial recording positions on said disc.

2. The servo system of claim 1 wherein said servo tracks comprise a plurality of alternately arranged odd and even servo tracks recorded on said disc such that adjacent pairs of said servo tracks identify said preselected radial recording positions on said disc.

3. The servo system of claim 2 wherein said servo control means comprises means for centering said read/write transducer between adjacent pairs of said servo tracks.

4. The servo system of claim 3 wherein both of said odd and even servo tracks comprise a serial array of magnetic transitions recorded on said disc, each of said series of transitions generating a waveform having a net DC component, said DC components of said odd and even servo tracks being equal in magnitude but opposite in polarity whereby said DC components of adjacent odd and even servo tracks cancel each other when said read/write transducer is disposed therebetween.

5. The servo system of claim 4 wherein said servo control means comprises means for nulling the output of said read/write transducer between said odd and even servo tracks.

6. The servo system of claim 3 wherein both of said odd and even servo tracks comprise serial arrays of magnetic transitions written on said disc, the DC components of said odd and even servo tracks being coded in the timing and order of the magnetic transitions.

7. The servo system of claim 6 wherein both of said odd and even servo tracks comprise a 110110110 . . . MFM code.

8. The servo system of claim 6 wherein both of said odd and even servo tracks comprise arrays of equally spaced transition pairs, each of said transition pairs comprising first and second equally spaced oppositely directed magnetic transitions, each of said transition pairs disposed in said even servo track having an identical order and each of said transition pairs disposed in said odd servo track having an order identically opposite of the order of said transition pairs disposed in said even servo track.

9. The servo system of claim 8 wherein each of said transition pairs of said odd and even servo tracks is equally spaced.

10. The servo system of claim 9 wherein the spacing between said transitions of said transition pairs is $\lambda_1$ and the spacing between said transition pairs is $\lambda_2$, $\lambda_2$ being greater in magnitude than $\lambda_1$.

11. The servo system of claim 10 wherein said odd and even servo tracks are provided with a phase difference of approximately 180°.

12. The servo system of claim 1 wherein said odd and even servo tracks are both provided with more than one frequency, the same frequencies being used to write both of said odd and even servo tracks.

13. The servo system of claim 12 wherein said odd and even servo tracks are both provided with first and second frequencies having differing wavelengths, said second frequency being impressed upon said first frequency.

14. The servo system of claim 13 wherein said odd and even servo tracks each comprise a series of magnetic transitions written on said disc, the order of the transitions in said odd servo track being identically opposite from the order of the transitions in said even servo tracks.

15. The servo control system of claim 13 wherein said odd servo track is inverted with respect to said even servo track.

16. The servo control system of claim 15 wherein said odd servo track is approximately 180° out of phase with respect to said even servo track.

17. The servo system of claim 1 wherein the storage medium includes a plurality of informational data sectors and a plurality of servo data sectors, said informational data sectors and said servo data sectors being alternately spaced in side-by-side relationship.

18. The servo system of claim 17 wherein said informational data sectors include cylinder identification data.

19. The servo system of claim 18 wherein cylinder identification data is read on the fly when the read/write head is traversing the recording media.

20. The servo system of claim 17 further including means for generating gating signals defining the positions of said plurality of informational data sectors and said plurality of servo data sectors.

21. The servo system of claim 20 wherein said means for generating gating signals comprises a dedicated track and a fixed dedicated servo transducer for following the same.

22. The servo system of claim 1 wherein said servo control means comprises a position signal demodulator means connected to the read/write transducer for generating a position signal.

23. The servo system of claim 22 further including a velocity transducer for providing a velocity signal representative of the velocity of the read/write transducer as the read/write transducer is radially moved to preselected recording positions on said disc by said positioning means.

24. The servo system of claim 23 wherein said servo control means further includes a summing means for receiving said position signal, said velocity signal and a velocity profile signal from a controller, the least significant bit of said velocity profile signal being greater than the maximum value of said position signal whereby whenever said velocity profile signal is present said velocity profile signal dominates said position signal causing said summing means to energize said positioning means to move the read/write transducer to a predetermined radial position on said disc.

25. A magnetic recording disc for use in an embedded servo track system that positions a read/write transducer to read data stored on said disc, said disc comprising a plurality of informational data sectors and a plurality of servo data sectors, said plurality of servo data sectors comprising a plurality of side-by-side, closely-spaced servo tracks recorded on said disc for identifying preselected radial positions on said disc, said servo tracks being provided with a nonuniform radial track density, said track density of said servo tracks varying substantially continuously from track to track according to the performance of a read/write transducer common to said tracks used to read said tracks from generally more dense at the periphery of said disc where transducer performance is high to generally less dense at the interior of said disc where transducer performance is low.

26. The magnetic recording disc of claim 25 wherein said servo tracks comprise a plurality of alternately arranged odd and even servo tracks recorded on said disc such that adjacent pairs of said servo tracks identify said preselected radial recording positions on said disc.

27. The magnetic recording disc of claim 26 wherein both of said odd and even servo tracks comprise a serial array of magnetic transitions recorded on said disc, each of said series of transitions generating a waveform having a net DC component, said DC components of said odd and even servo tracks being equal in magnitude but opposite in polarity whereby said DC components of adjacent odd and even servo tracks cancel each other when a read/write transducer is disposed therebetween.

28. The magnetic recording disc of claim 27 wherein both of said odd and even servo tracks comprise serial arrays of magnetic transitions written on said disc, the DC components of said odd and even servo tracks being coded in the timing and order of the magnetic transitions.

29. The magnetic recording disc of claim 27 wherein both of said odd and even servo tracks comprise a 110110110 ... MFM code.

30. The magnetic recording disc of claim 28 wherein each of said odd and even servo tracks comprises an array of equally spaced transition pairs, each of said transition pairs comprising first and second equally spaced oppositely directed transitions, each of said transition pairs disposed in said even servo track having an identical order and each of said transition pairs disposed in said odd servo track having an order identically opposite of the order of said transition pairs disposed in said even servo track.

31. The magnetic recording disc of claim 30 wherein each of said transition pairs of said odd and even servo tracks is equally spaced.

32. The magnetic recording disc of claim 31 wherein the spacing between said transitions of said transitions pairs is $\lambda_1$, and the spacing between said transitions pairs is $\lambda_2$, $\lambda_2$ being greater in magnitude than $\lambda_1$.

33. The magnetic recording disc of claim 32 wherein said odd and even servo tracks are provided with a phase difference of approximately 180°.

34. The magnetic recording disc of claim 27 wherein said odd and even servo tracks are both provided with more than one frequency, the same frequencies being used to write both of said odd and even servo tracks.

35. The magnetic recording disc of claim 34 wherein said odd and even servo tracks are both provided with first and second frequencies having differing wavelengths, said second frequency being impressed upon said first frequency.

36. The magnetic recording disc of claim 35 wherein said odd and even servo tracks each comprise a series of magnetic transitions written on said disc, the order of the transitions in said odd servo track being identically opposite from the order of the transitions in said even servo track.

37. The magnetic recording disc of claim 36 wherein said odd servo track is inverted with respect to said even servo track.

38. The magnetic recording disc of claim 31 wherein said odd servo track is approximately 180° out of phase with respect to said even servo track.

39. The magnetic recording disc of claim 25 wherein said informational data sectors include cylinder identification data.

40. A method for positioning a read/write transducer relative to a magnetic storage disc to read data stored on said disc, the method comprising the steps of:

driving said disc to provide relative movement between said disc and said read/write transducer thereby enabling the transfer of data between said disc and said transducer;

providing a plurality of side-by-side, closely spaced alternately arranged odd and even servo tracks recorded on said disc such that an adjacent pair of said odd and even servo tracks identifies a preselected radial position on said disc therebetween, each of said odd and even servo tracks generating a waveform having a net DC component, said DC components of said odd and even servo tracks being equal in magnitude but opposite in polarity whereby said DC components of said odd and even servo tracks cancel each other when the read/write transducer is disposed therebetween, said servo tracks being provided with a nonuniform, radial density, varying substantially continuously from track to track according to the performance of the read/write transducer common to said tracks used to read said tracks from generally more dense at the periphery of said disc where transducer performance is high to generally less dense at the interior of said disc where transducer performance is low;

sensing the output of the read/write transducer; and positioning the read/write transducer to null the output of the transducer thus centering the same between odd and even servo tracks.

41. The method of claim 40 wherein both of said odd and even servo tracks comprise a serial array of transitions in the recording medium, the DC components of said odd and even servo tracks being coded in the timing and order of the transitions.

42. The method of claim 41 wherein both of said odd and even servo tracks comprise a 110110110 ... MFM code.

43. The method of claim 41 further including the steps of:

providing alternately spaced informational data and servo data sectors on the recording medium;

providing a cylinder identification in said informational data sectors; and reading said cylinder identification on the fly when the read/write transducer is traversing the recording medium.

44. A method for writing a clock track on a magnetic storage medium comprising the steps of:
- providing a fixed read/write head;
- providing at least one moving read/write head;
- translating said magnetic storage medium relative to said fixed and said moving heads, whereby information may be written on said medium in the form of magnetic transitions and said magnetic transitions may be read with said fixed and said moving heads;
- writing a single pair of transitions with said fixed head;
- selecting a predetermined number N or transition pairs for a clock track;
- reading said single pair of transitions to create a single initial electrical pulse;
- phase-lock looping said initial electrical pulse to a number of electrical pulses approximately equal to the square root of N;
- writing an intermediate clock track with said moving head, said intermediate clock track having a number of transition pairs equal to the square root of N;
- reading said intermediate clock track to create a number of intermediate clock electrical pulses equal to the square root of N;
- phase-lock looping said intermediate clock electrical pulses to a number of electrical pulses equal to N; and
- writing a clock track with said fixed head having N transition pairs.

45. The method of claim 44 further including the steps of:
- checking for the correct number of transitions on said clock track; and
- checking the closure for said clock track.

46. The method of claim 45 further including the steps of:
- providing said fixed head with a plurality of read/write gaps;
- selecting a second gap on said fixed head;
- reading said intermediate clock track to create a number of intermediate clock electrical pulses equal to the square root of N;
- phase-lock looping said intermediate clock electrical pulses to a number of electrical pulses equal to N; and
- writing a redundant clock track with said second gap of said fixed head.

47. A method for establishing a desired track density on a magnetic storage medium comprising the steps of:
- providing at least one moving read/write head;
- translating said magnetic storage medium relative to said read/write head, whereby information may be written on said medium in the form of magnetic transitions and said magnetic transitions may be read with said read/write head;
- providing means for positioning said read/write head at different positions on said storage medium;
- positioning said read/write head at a first limit stop in the range of travel of said means for positioning;
- writing a first reference track with said read/write head;
- choosing a predetermined percentage of amplitude reduction, X%, that is related to a desired track density;
- reading said first reference track with said read/write head;
- displacing said read/write head away from said first limit stop until the amplitude of said first reference track is reduced to X% of its original amplitude;
- writing a second reference track with said read/write head;
- displacing said read/write head again in the same direction until the amplitude of said second reference track is reduced to X% of its original amplitude;
- continuing to write successive reference tracks and displacing said read/write head across said storage medium by writing a reference track and moving said read/write head away from the last reference track written until the amplitude of the last reference track written is equal to X% of its original amplitude;
- counting the number of reference tracks written;
- stopping when a second limit stop in the range of travel of said means for positioning is encountered;
- checking the track density to ensure that it is within a predetermined range of the desired track density;
- if the track density is high, erase said storage medium, lower said X% value and repeat the programming method steps;
- if the track density is low, erase said storage medium, increase said X% value and repeat the aforementioned method steps; and
- stopping if the track density is within a predetermined range of the desired track density.

48. The method of claim 47 wherein the distance traversed between each reference track written is approximately half of a data track and said X% value is in the range of 25% to 50%.

49. The method of claim 47 wherein said storage medium comprises a magnetic disc and a varying track density is provided, said track density being more dense at the periphery of said disc and less dense at the interior of said disc.

50. The method of claim 49 further including the step of varying said X% value as reference tracks are written across the disc said X% value being larger at the periphery of said disc and lower at the interior of said disc.

51. A method for writing embedded servo data on a magnetic storage medium comprising the steps of:
- providing a first moving read/write head;
- translating said magnetic storage medium relative to said read/write head, whereby information may be written on said medium in the form of magnetic transitions and said magnetic transitions may be read with said read/write head;
- providing means for positioning said read/write head at different positions on said storage medium;
- positioning said first read/write head at a first limit stop in the range of travel of said means for positioning;
- dividing said magnetic storage medium into servo data sectors and reference data sectors;
- writing a first servo data track with said read/write head in said servo data sectors on said storage medium;
- writing a first reference track with said read/write head in said reference data sectors on said storage medium;
- choosing a predetermined percentage of amplitude reduction, X%, that is related to a desired track density;

reading said first reference track with said read/write head;

displacing said read/write head away from said first limit stop until the amplitude of said first reference track is reduced to X% of its original amplitude;

writing a second reference track with said read/write head in said reference data sectors;

displacing said read/write head again in the same direction until the amplitude of said second reference track is reduced to X% of its original amplitude;

writing a second servo track with said read/write head in said reference data sectors;

continuing to alternately write two reference tracks and one servo track according to the method steps previously set forth;

keeping a measure of the number of servo data tracks written;

stopping when a second limit stop in the range of travel of said means for positioning is encountered;

checking the servo track density to ensure that it is within a predetermined range of the desired track density;

if the servo track density if high, erase said storage medium, lower said X% value and repeat the aforementioned method steps;

if the servo track density is low, erase said storage medium, raise said X% value and repeat the aforementioned method steps;

stopping if the servo track density is within a predetermined range of the desired servo track density; and erasing the reference data sectors.

52. The method of claim 51 further including the steps of:
providing at least one additional moving read/write head which is displaced relative to a translating storage medium along with said first read/write head by said positioning means; and
writing servo data with said at least one additional moving read/write head at the same positions that servo data is written with said first moving read/write head.

53. The method of claim 51 further including the step of alternately writing odd and even servo data tracks.

54. The method of claim 51 wherein the distance traversed between each reference track written is approximately half of a data track and said X% value is in the range of 25% to 50%.

55. The method of claim 51 wherein said storage medium comprises a magnetic disc and a varying track density is provided said track density being more dense at the periphery of said disc and less dense at the interior of said disc.

56. The method of claim 51 further including the step of varying said X% value as reference tracks are written across said disc said X% value being larger at the periphery of said disc and lower at the interior of said disc.

57. The method of claim 53 wherein said servo tracks comprise a plurality of alternately arranged odd and even servo tracks recorded on said storage medium such that adjacent pairs of said servo tracks identify said preselected radial recording positions on said storage medium.

58. The method of claim 57 wherein both of said odd and even servo tracks comprise a serial array of magnetic transitions recorded on said storage medium, each of said series of transitions generating a waveform having a net DC component, said DC components of said odd and even servo tracks being equal in magnitude but opposite in polarity whereby said DC components of adjacent odd and even servo tracks cancel each other when a read/write transducer is disposed therebetween.

59. The method of claim 51 wherein both of said odd and even servo tracks comprise serial arrays of magnetic transitions written on said storage medium, the DC components of said odd and even servo tracks being coded in the timing and order of the magnetic transitions.

60. The method of claim 58 wherein both of said odd and even servo tracks comprise a 110110110 . . . MFM code.

61. The method of claim 59 wherein each of said odd and even servo tracks comprises an array of equally spaced transition pairs, each of said transition pairs comprising first and second equally spaced oppositely directed transitions, each of said transition pairs disposed in said even servo track having an identical order and each of said transition pairs disposed in said odd servo track having an order identically opposite of the order of said transition pairs disposed in said even servo track.

62. The method of claim 61 wherein each of said transition pairs of said odd and even servo tracks is equally spaced.

63. The method of claim 62 wherein the spacing between said transitions of said transitions pairs is $\lambda_1$, and the spacing between said transitions pairs is $\lambda_2$, $\lambda_2$ being greater in magnitude than $\lambda_1$.

64. The method of claim 63 wherein said odd and even servo tracks are provided with a phase difference of approximately 180°.

65. The method of claim 58 wherein said odd and even servo tracks are both provided with more than one frequency, the same frequencies being used to write both of said odd and even servo tracks.

66. The method of claim 65 wherein said odd and even servo tracks are both provided with first and second frequencies having differing wavelengths, said second frequency being impressed upon said first frequency.

67. The method of claim 66 wherein said odd and even servo tracks each comprise a series of magnetic transitions written on said storage medium, the order of the transitions in said odd servo track being identically opposite from the order of the transitions in said even servo track.

68. The method of claim 67 wherein said odd servo track is inverted with respect to said even servo track.

69. The method of claim 68 wherein said odd servo track is approximately 180° out of phase with respect to said even servo track.

70. A method for writing embedded servo data on a magnetic storage medium comprising the steps of:
providing a fixed read/write head;
providing a first moving read/write head;
translating said magnetic storage medium relative to said fixed and said moving heads, whereby information may be written on said medium in the form of magnetic transitions and said magnetic transitions may be read with said fixed and said moving heads;
writing a single pair of transitions with said fixed head;

selecting a predetermined number N of transition pairs for a clock track;

reading said single pair of transitions to create a single initial electrical pulse;

phase-lock looping said initial electrical pulse to a number of electrical pulses approximately equal to the square root of N;

holding said moving head stationary and writing an intermediate clock track with said moving head, said intermediate clock track having a number of transition pairs equal to the square root of N;

reading said intermediate clock track to create a number of intermediate clock electrical pulses equal to the square root of N;

phase-lock looping said intermediate clock electrical pulses to a number of electrical pulses equal to N;

writing a clock track with said fixed head having N transition pairs;

providing means for positioning said first moving read/write head at different positions on said storage medium;

positioning said first moving read/write head at a first limit stop in the range of travel of said means for positioning;

writing a first reference track with said first moving read/write head;

choosing a predetermined percentage of amplitude reduction, X%, that is related to a desired track density;

reading said first reference track with said first moving read/write head;

displacing said first moving read/write head away from said first limit stop until the amplitude of said first reference track is reduced to X% of its original amplitude;

writing a second reference track with said first moving read/write head;

displacing said first moving read/write head again in the same direction until the amplitude of said second reference track is reduced to X% of the original amplitude;

continuing to write successive reference tracks and displacing said first moving read/write head across said storage medium by writing a reference track and moving said first moving read/write head away from the last reference track written until the amplitude of the last reference track written is equal to X% if its original amplitude;

counting the number of reference tracks written;

stopping when a second limit stop in the range of travel of said means for positioning is encountered;

erasing said storage medium;

checking the track density to ensure that it is written a predetermined range of the desired track density;

if the track density is high, lower said X% value and repeat the programming method steps;

if the track density is low, increase said X% value and repeat the aforementioned method steps;

go to the next step of the method if the track density is within a predetermined range of the desired track density;

positioning said first moving read/write head at a first limit stop in the range of travel of said means for positioning;

dividing said magnetic storage medium into servo data sectors and reference data sectors;

writing a first servo data track with said first moving read/write head in said servo data sectors on said storage medium;

writing a first reference track with said first moving read/write head in said reference data sectors on said storage medium;

reading said first reference track with said moving read/write head;

displacing said first moving read/write head away from said first limit stop until the amplitude of said first reference track is reduced to X% of its original amplitude;

writing a second reference track with said first moving read/write head in said reference data sectors;

displacing said first moving read/write head again in the same direction until the amplitude of said second reference track is reduced to X% of its original amplitude;

writing a second servo track with said first moving read/write head in said reference data sectors;

continuing to alternately write two reference tracks and one servo track according to the method steps previously set forth;

keeping a measure of the number of servo data tracks written;

stopping when a second limit step in the range of travel of said means for positioning is encountered;

checking the servo track density to ensure that it is within a predetermined range of the desired track density;

if the servo track density is high, erase said storage medium, lower said X% value and repeat the aforementioned method steps;

if the servo track density is low, erase said storage medium, raise said X% value and repeat the aforementioned method steps;

stopping if the servo track density is within a predetermined range of the desired servo track density; and erasing only the reference data sectors.

71. The method of claim 70 further including the steps of:

providing at least one additional moving read/write head which is displaced relative to a translating storage medium along with said first moving read/write head by said positioning means; and writing servo data with said at least one additional moving read/write head at the same positions that servo data is written with said first moving read/write head.

* * * * *